(12) United States Patent
Hayward

(10) Patent No.: US 11,048,269 B1
(45) Date of Patent: *Jun. 29, 2021

(54) ANALYZING TELEMATICS DATA TO DETERMINE TRAVEL EVENTS AND CORRECTIVE ACTIONS

(71) Applicant: State Farm Mutual Automobile Insurance Company, Bloomington, IL (US)

(72) Inventor: Gregory Hayward, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 84 days.

This patent is subject to a terminal disclaimer.

(21) Appl. No.: 16/379,343

(22) Filed: Apr. 9, 2019

Related U.S. Application Data

(63) Continuation of application No. 16/002,107, filed on Jun. 7, 2018, now Pat. No. 10,365,662, which is a
(Continued)

(51) Int. Cl.
*G05D 1/02* (2020.01)
*G01S 19/42* (2010.01)
(Continued)

(52) U.S. Cl.
CPC ....... *G05D 1/0278* (2013.01); *G01C 21/3492* (2013.01); *G01C 21/3667* (2013.01);
(Continued)

(58) Field of Classification Search
CPC ............... G05D 1/0278; G05D 1/0223; G05D 2201/0213; G01S 19/42; G01C 21/3492; G01C 21/3667
See application file for complete search history.

(56) References Cited

U.S. PATENT DOCUMENTS 6,437,688 B1 8/2002 Kobayashi
6,459,371 B1 10/2002 Pike
(Continued)

FOREIGN PATENT DOCUMENTS

JP 2012-126273 A 7/2012
WO 20181102280 A1 6/2018

OTHER PUBLICATIONS

U.S. Appl. Analyzing Telematics Data to Determine Travel Events and Corrective Actions, dated Oct. 18, 2017., U.S. Appl. No. 15/787,311.
(Continued)

*Primary Examiner* — Yuen Wong

(57) ABSTRACT

A computer-implemented method of using telematics data associated with an originating vehicle at a destination vehicle is provided. The method includes receiving telematics data associated with the originating vehicle by (1) a mobile device, or (2) a smart vehicle controller associated with a driver, and analyzing the telematics data to determine that a travel event exists. If the travel event exists, the method may determine if the travel event presents an issue or problem for the vehicle (or driver) by determining that a GPS location of the travel event is located along the current travel route of the vehicle and, if so, automatically taking a preventive or corrective action that alleviates a negative impact of the travel event on the driver or vehicle to facilitate safer or more efficient vehicle travel. Insurance discounts may be provided based upon the risk mitigation or prevention functionality, or usage thereof.

20 Claims, 7 Drawing Sheets

Related U.S. Application Data continuation of application No. 15/787,311, filed on Oct. 18, 2017, now Pat. No. 10,042,363, which is a continuation of application No. 14/990,056, filed on Jan. 7, 2016, now Pat. No. 9,836,062.

(60) Provisional application No. 62/250,286, filed on Nov. 3, 2015, provisional application No. 62/247,334, filed on Oct. 28, 2015, provisional application No. 62/232,054, filed on Sep. 24, 2015, provisional application No. 62/232,050, filed on Sep. 24, 2015, provisional application No. 62/232,065, filed on Sep. 24, 2015, provisional application No. 62/232,097, filed on Sep. 24, 2015, provisional application No. 62/232,083, filed on Sep. 24, 2015, provisional application No. 62/232,075, filed on Sep. 24, 2015, provisional application No. 62/232,090, filed on Sep. 24, 2015, provisional application No. 62/232,035, filed on Sep. 24, 2015, provisional application No. 62/232,045, filed on Sep. 24, 2015, provisional application No. 62/207,561, filed on Aug. 20, 2015, provisional application No. 62/204,749, filed on Aug. 13, 2015, provisional application No. 62/113,749, filed on Feb. 9, 2015, provisional application No. 62/105,468, filed on Jan. 20, 2015.

(51) Int. Cl.
*G01C 21/36* (2006.01)
*G01C 21/34* (2006.01)

(52) U.S. Cl.
CPC ............ *G01S 19/42* (2013.01); *G05D 1/0223* (2013.01); *G05D 2201/0213* (2013.01)

(56) References Cited

U.S. PATENT DOCUMENTS

| | | |
|---|---|---|
| 7,280,898 B2 | 10/2007 | Lesesky et al. |
| 7,421,334 B2 | 9/2008 | Dahlgren et al. |
| 8,117,049 B2 | 2/2012 | Berkobin et al. |
| 8,311,858 B2 | 11/2012 | Everett et al. |
| 8,731,768 B2 | 5/2014 | Fernandes et al. |
| 8,731,977 B1 | 5/2014 | Hardin et al. |
| 8,799,032 B2 | 8/2014 | Fernandes et al. |
| 8,805,707 B2 | 8/2014 | Schumann et al. |
| 8,862,486 B2 | 10/2014 | Cordova et al. |
| 8,922,393 B2 | 12/2014 | Ricci |
| 8,924,240 B2 | 12/2014 | Depura et al. |
| 8,935,036 B1* | 1/2015 | Christensen ........... G06Q 40/08 701/29.1 |
| 9,014,911 B2 | 4/2015 | Ricci |
| 9,031,545 B1 | 5/2015 | Srey et al. |
| 9,037,394 B2 | 5/2015 | Fernandes et al. |
| 9,043,130 B2 | 5/2015 | Ricci |
| 9,046,374 B2 | 6/2015 | Ricci |
| 9,047,778 B1* | 6/2015 | Cazanas ................. G08G 1/166 |
| 9,105,051 B2 | 8/2015 | Ricci |
| 9,111,316 B2 | 8/2015 | Fernandes et al. |
| 9,123,058 B2 | 9/2015 | Ricci |
| 9,129,449 B2 | 9/2015 | Davidson |
| 9,159,232 B2 | 10/2015 | Ricci |
| 9,164,957 B2 | 10/2015 | Hassib et al. |
| 9,176,924 B2 | 11/2015 | Ricci |
| 9,240,018 B2 | 1/2016 | Ricci |
| 9,355,423 B1 | 5/2016 | Slusar |
| 9,390,451 B1 | 7/2016 | Slusar |
| 9,398,423 B2 | 7/2016 | Cordova et al. |
| 9,421,864 B1 | 8/2016 | Srey et al. |
| 9,443,270 B1 | 9/2016 | Friedman et al. |
| 9,454,786 B1 | 9/2016 | Srey et al. |
| 9,558,520 B2 | 1/2017 | Peak et al. |
| 9,619,203 B2 | 4/2017 | Tamir et al. |
| 9,633,318 B2 | 4/2017 | Plante |
| 9,672,569 B2 | 6/2017 | Fernandes et al. |
| 9,672,571 B2 | 6/2017 | Fernandes et al. |
| 9,679,487 B1 | 6/2017 | Hayward |
| 9,783,159 B1 | 10/2017 | Potter et al. |
| 9,786,154 B1 | 10/2017 | Potter et al. |
| 9,841,767 B1 | 12/2017 | Hayward |
| 9,904,289 B1 | 2/2018 | Hayward |
| 9,911,159 B1 | 3/2018 | Srey et al. |
| 9,932,033 B2 | 4/2018 | Slusar et al. |
| 10,012,987 B2 | 7/2018 | Shem et al. |
| 10,023,114 B2 | 7/2018 | Adams et al. |
| 10,032,226 B1 | 7/2018 | Suizzo et al. |
| 10,037,578 B2 | 7/2018 | Bogovich et al. |
| 10,037,579 B2 | 7/2018 | Bogovich et al. |
| 10,037,580 B2 | 7/2018 | Bogovich et al. |
| 10,042,363 B1* | 8/2018 | Hayward ............... G08G 1/166 |
| 10,042,364 B1 | 8/2018 | Hayward |
| 10,054,453 B1 | 8/2018 | Hayward |
| 10,055,982 B1 | 8/2018 | Hayward |
| 10,055,985 B1 | 8/2018 | Hayward |
| 10,074,139 B2 | 9/2018 | Bogovich et al. |
| 10,089,868 B1 | 10/2018 | Hayward |
| 10,096,038 B2 | 10/2018 | Ramirez et al. |
| 10,096,067 B1 | 10/2018 | Slusar |
| 10,096,070 B1 | 10/2018 | Slusar et al. |
| 10,109,016 B1 | 10/2018 | Saenglongma |
| 10,121,204 B1 | 11/2018 | Brandmaier et al. |
| 10,134,091 B2 | 11/2018 | Adams et al. |
| 10,157,422 B2 | 12/2018 | Jordan et al. |
| 10,169,822 B2 | 1/2019 | Jarvis et al. |
| 10,198,772 B2 | 2/2019 | Parameshwaran |
| 10,210,772 B2 | 2/2019 | Tamir et al. |
| 10,216,194 B1 | 2/2019 | Hayward |
| 10,216,195 B2 | 2/2019 | Switkes et al. |
| 10,217,169 B2 | 2/2019 | Schumann et al. |
| 10,229,462 B2 | 3/2019 | Bogovich et al. |
| 10,231,093 B2 | 3/2019 | Cordova et al. |
| 10,234,871 B2 | 3/2019 | Klaus et al. |
| 10,255,638 B2 | 4/2019 | Cote et al. |
| 10,255,639 B1 | 4/2019 | Friedman et al. |
| 10,317,223 B1 | 6/2019 | Hayward |
| 10,354,333 B1 | 7/2019 | Hayward |
| 10,360,636 B1 | 7/2019 | Kraft et al. |
| 10,380,699 B2 | 8/2019 | Fernandes et al. |
| 10,395,319 B1 | 8/2019 | Srey et al. |
| 10,395,320 B1 | 8/2019 | Srey et al. |
| 10,417,713 B1 | 9/2019 | Brandmaier et al. |
| 10,438,424 B2 | 10/2019 | Hassib et al. |
| 10,445,758 B1 | 10/2019 | Bryer et al. |
| 10,453,352 B1 | 10/2019 | Hayward |
| 10,509,414 B1 | 12/2019 | Hayward |
| 10,571,908 B2 | 2/2020 | Joyce et al. |
| 10,572,943 B1 | 2/2020 | Tye et al. |
| 10,634,507 B2 | 4/2020 | Krishnan et al. |
| 10,657,597 B1 | 5/2020 | Billman et al. |
| 10,664,918 B1 | 5/2020 | Slusar |
| 10,699,350 B1 | 6/2020 | Suizzo et al. |
| 10,726,495 B1 | 7/2020 | Saenglongma |
| 10,726,687 B2 | 7/2020 | Song |
| 10,733,673 B1 | 8/2020 | Slusar |
| 10,740,850 B1 | 8/2020 | Slusar |
| 10,755,566 B2 | 8/2020 | Tennent et al. |
| 10,775,179 B1 | 9/2020 | Hayward |
| 10,783,586 B1 | 9/2020 | Augustine et al. |
| 10,783,587 B1 | 9/2020 | Augustine et al. |
| 10,787,122 B2 | 9/2020 | Adams et al. |
| 10,796,369 B1 | 10/2020 | Augustine et al. |
| 10,803,525 B1 | 10/2020 | Augustine et al. |
| 10,803,529 B2 | 10/2020 | Adams et al. |
| 2005/0065711 A1 | 3/2005 | Dahlgren et al. |
| 2007/0054665 A1 | 3/2007 | Kellum |
| 2007/0159354 A1 | 7/2007 | Rosenberg |
| 2010/0015963 A1 | 1/2010 | Hesse et al. |
| 2010/0191391 A1 | 7/2010 | Zeng |
| 2010/0286864 A1 | 11/2010 | Kawauchi et al. |
| 2010/0312466 A1 | 12/2010 | Katzer et al. |
| 2011/0161116 A1 | 6/2011 | Peak et al. |
| 2012/0101855 A1 | 4/2012 | Downs et al. |

(56) References Cited

U.S. PATENT DOCUMENTS

| | | | |
|---|---|---|---|
| 2012/0303392 | A1 | 11/2012 | Depura et al. |
| 2013/0013347 | A1 | 1/2013 | Ling et al. |
| 2013/0013348 | A1 | 1/2013 | Ling et al. |
| 2013/0030642 | A1 | 1/2013 | Bradley et al. |
| 2013/0090139 | A1 | 4/2013 | McHenry et al. |
| 2013/0169812 | A1 | 7/2013 | Lu |
| 2014/0046701 | A1 | 2/2014 | Steinberg et al. |
| 2014/0081675 | A1* | 3/2014 | Ives .................. G06Q 40/08 705/4 |
| 2014/0142799 | A1 | 5/2014 | Ferguson et al. |
| 2014/0309806 | A1 | 10/2014 | Ricci |
| 2014/0309870 | A1 | 10/2014 | Ricci et al. |
| 2014/0309880 | A1 | 10/2014 | Ricci |
| 2014/0309886 | A1 | 10/2014 | Ricci |
| 2014/0309891 | A1 | 10/2014 | Ricci |
| 2014/0310594 | A1 | 10/2014 | Ricci et al. |
| 2014/0310610 | A1 | 10/2014 | Ricci |
| 2014/0310739 | A1 | 10/2014 | Ricci et al. |
| 2014/0320260 | A1 | 10/2014 | Van Wiemeersch et al. |
| 2014/0330596 | A1 | 11/2014 | Depura et al. |
| 2015/0077236 | A1 | 3/2015 | Le Masurier |
| 2015/0127570 | A1 | 5/2015 | Doughty et al. |
| 2015/0145995 | A1 | 5/2015 | Shahraray et al. |
| 2015/0179062 | A1* | 6/2015 | Ralston ............... G01C 21/26 701/117 |
| 2015/0232065 | A1 | 8/2015 | Ricci et al. |
| 2015/0262487 | A1 | 9/2015 | Cazanas et al. |
| 2015/0266473 | A1 | 9/2015 | Hayasaka |
| 2015/0353014 | A1 | 12/2015 | Li |
| 2016/0021178 | A1 | 1/2016 | Liu et al. |
| 2016/0042644 | A1 | 2/2016 | Velusamy |
| 2016/0192108 | A1 | 6/2016 | Chaudhary et al. |
| 2016/0205419 | A1 | 7/2016 | Ricci et al. |
| 2016/0232791 | A1 | 8/2016 | Tosa et al. |
| 2016/0277601 | A1 | 9/2016 | Seymour |
| 2016/0334227 | A1 | 11/2016 | Davidson |
| 2017/0021764 | A1 | 1/2017 | Adams et al. |
| 2017/0075701 | A1 | 3/2017 | Ricci et al. |
| 2017/0120906 | A1 | 5/2017 | Penilla et al. |
| 2017/0178498 | A1 | 6/2017 | McErlean |
| 2017/0337813 | A1 | 11/2017 | Taylor |
| 2018/0022327 | A1 | 1/2018 | Kitagawa et al. |
| 2018/0096601 | A1 | 4/2018 | Chow et al. |
| 2018/0144633 | A1 | 5/2018 | Minemura et al. |
| 2018/0201263 | A1 | 7/2018 | Slusar et al. |

OTHER PUBLICATIONS

U.S. Appl. Broadcasting Information Related to Hazards Impacting Vehicle Travel, filed Oct. 30, 2017., U.S. Appl. No. 15/798,107.
U.S. Appl. Broadcasting Telematics Data to Nearby Mobile Computing Devices, Vehicles, and Infrastructure, filed Oct. 18, 2017., U.S. Appl. No. 15/787,293.
U.S. Appl. Determining Abnormal Traffic Conditions From a Broadcast of Telematics Data Originating From Another Vehicle, filed Oct. 18, 2017., U.S. Appl. No. 15/787,305.
U.S. Appl. Determining Corrective Actions Based Upon Broadcast of Telematics Data Originating From Another Vehicle, dated Oct. 18, 2017., U.S. Appl. No. 15/787,317.
U.S. Appl. filed Aug. 21, 2018, Hayward; Gregory L., U.S. Appl. No. 10/055,982.
U.S. Appl. Methods of Facilitating Emergency Assistance, filed Aug. 14, 2017., U.S. Appl. No. 15/676,470.
U.S. Appl. Methods of Theft Prevention or Mitigation, filed Aug. 14, 2017., U.S. Appl. No. 15/676,460.
U.S. Appl. No. 14/990,121, Notice of Allowance, dated Oct. 10, 2017.
U.S. Appl. No. 14/990,139, Notice of Allowance, dated Aug. 14, 2017.
U.S. Appl. No. 14/990,165, Notice of Allowance, dated Aug. 10, 2017.
U.S. Appl. No. 14/990,228, Notice of Allowance, dated Aug. 31, 2017.
U.S. Appl. Using Emergency Response System (EMS) Vehicle Telematics Data to Reduce Accident Risk, filed Oct. 30, 2017., U.S. Appl. No. 15/798,093.
U.S. Appl. Using Train Telematics Data to Provide Information in One or More Vehicles to Reduce Accident Risk, filed Oct. 30, 2017., U.S. Appl. No. 15/798,062.
U.S. Appl. Using Train Telematics Data to Reduce Accident Risk, filed Oct. 30, 2017., U.S. Appl. No. 15/798,019.
US. Appl. filed Aug. 21, 2018, Hayward; Gregory., U.S. Appl. No. 10/054,453.
U.S. Appl. No. 14/798,609, Methods of Providing Insurance Savings Based Upon Telematics and Anonymous Driver Data, filed Jul. 14, 2015.
U.S. Appl. No. 14/798,615, Methods of Providing Insurance Savings Based Upon Telematics and Driving Behavior Identification, filed Jul. 14, 2015.
U.S. Appl. No. 14/798,626, Methods of Providing Insurance Savings Based Upon Telematics and Usage-Based Insurance, filed Jul. 14, 2015.
U.S. Appl. No. 14/798,633, Methods of Providing Insurance Savings Based Upon Telematics and Insurance Incentives, filed Jul. 14, 2015.
U.S. Appl. No. 14/798,741, Methods of Determining Accident Cause and/or Fault Using Telematics Data, filed Jul. 14, 2015.
U.S. Appl. No. 14/798,745, Methods of Reconstructing an Accident Scene Using Telematics Data filed Jul. 14, 2015.
U.S. Appl. No. 14/798,750, Methods of Insurance Claim Buildup Detection Using Teiematics Data, filed Jul. 14, 2015.
U.S. Appl. No. 14/798,757, Methods of Facilitating Emergency Assistance, filed Jul. 14, 2015.
U.S. Appl. No. 14/798,763, Methods of Intelligent Routing, filed Jul. 14, 2015.
U.S. Appl. No 14/798,769, Methods of Theft Prevention or Mitigation, filed Jul. 14, 2015.
U.S. Appl. No. 14/798,770, Methods of Pre-Generating Insurance Claims, filed Jul. 14, 2015.
U.S. Appl. No. 14/989,946, Alert Notifications Utilizing Broadcasted Telernatics Data, filed Jan. 7, 2016.
U.S. Appl. No. 14/989,946, Nonfinal Office Action, dated Dec. 9, 2016.
U.S. Appl. No. 14/989,946, Notice of Allowance, dated Mar. 17, 2017.
U.S. Appl. No. 14/989,950, Advisory Action, dated Jun. 21, 2017.
U.S. Appl. No. 14/989,950, Broadcasting Telernatics Data to Nearby Mobile Computing Devices, Vehicles, and Infrastructure, filed Jan. 7, 2016.
U.S. Appl. No. 14/989,950, Final Office Action, dated Apr. 19, 2017.
U.S. Appl. No. 14/989,950, Nonfinal Office Action, dated Nov. 18, 2016.
U.S. Appl. No. 14/989,950, Notice of Allowance, dated Sep. 12, 2017.
U.S. Appl. No. 14/989,979, Advisory Action, dated Jun. 26, 2017.
U.S. Appl. No. 14/989,979, Determining Abnormal Traffic Conditions from a Broadcast of Telematics Data Originating from Another Vehicle, filed Jan. 7, 2016.
U.S. Appl. No. 14/989,979, Final Office Action, dated Apr. 24, 2017.
U.S. Appl. No. 14/989,979, Nonfinal Office Action, dated Nov. 30, 2016.
U.S. Appl. No. 14/969,979, Notice of Allowance, dated Sep. 14, 2017.
U.S. Appl. No. 14/989,990, Taking Corrective Action Based Upon Telematics Data Broadcast from Another Vehicle, filed Jan. 7, 2016.
U.S. Appl. No. 14/990,056, Advisory Action, dated Jul. 6, 2017.
U.S. Appl. No. 14/990,056, Analyzing Telematics Data to Determine Travel Events and Corrective Actions, filed Jan. 7, 2016.
U.S. Appl. No. 14/990,056, Final Office Action, dated Apr. 21, 2017.
U.S. Appl. No. 14/990,056, Nonfinal Office Action, dated Dec. 1, 2016.
U.S. Appl. No. 14/990,056, Notice of Allowance, dated Sep. 13, 2017.

(56) References Cited

OTHER PUBLICATIONS

U.S. Appl. No. 14/990,073, Providing Insurance Discounts Based Upon Usage of Telematics Data-Based Risk Mitigation and Prevention Functionality, filed Jan. 7, 2016.
U.S. Appl. No. 14/990,116, Notice of Allowance, dated Sep. 13, 2017.
U.S. Appl. No. 14/990,116, Advisory Action, dated Jun. 28, 2017.
U.S. Appl. No. 14/990,116, Determining Corrective Actions Based Upon Broadcast of Telematics Data Originating From Another Vehicle, filed Jan. 7, 2016.
U.S. Appl. No. 14/990,116, Final Office Action, dated Apr. 19, 2017.
U.S. Appl. No. 14/990,116, Nonfinal Office Action, dated Nov. 25, 2016.
U.S. Appl. No. 14/990,121, Advisory Action, dated Jul. 17, 2017.
U.S. Appl. No. 14/990,121, Facilitating Safer Vehicle Travel Utilizing Telematics Data, filed Jan. 7, 2016.
U.S. Appl. No. 14/990,121, Final Office Action, dated Apr. 19, 2017.
U.S. Appl. No. 14/990,121, Nonfinal Office Action, dated Dec. 15, 2016.
U.S. Appl. No. 14/990,139, Final Office Action, dated Apr. 19, 2017.
U.S. Appl. No. 14/990,139, Nonfinal Office Action, dated Nov. 18, 2016.
U.S. Appl. No. 14/990,139, Using Train Telematics Data to Reduce Accident Risk, filed Jan. 7, 2016.
U.S. Appl. No. 14/990,165, Final Office Action, dated Apr. 19, 2017.
U.S. Appl. No. 14/990,165, Nonfinal Office Action, dated Nov. 23, 2016.
U.S. Appl. No. 14/990,165, Using Train Telematics Data to Provide information in One or More Vehicles to Reduce Accident Risk, filed Jan. 7, 2016.
U.S. Appl. No. 14/990,209, Final Office Action, dated Apr. 20, 2017.
U.S. Appl. No. 14/990,209, Nonfinal Office Action, dated Nov. 18, 2016.
U.S. Appl. No. 14/990,209, Using Emergency Response System (EMS) Vehicle Telematics Data to Reduce Accident Risk, filed Jan. 7, 2016.
U.S. Appl. No. 14/990,228, Broadcasting Information Related to Hazards Impacting Vehicle Travel, filed Jan. 7, 2016.
U.S. Appl. No. 14/990,228, Final Office Action, dated Apr. 20, 2017.
U.S. Appl. No. 14/990,228, Nonfinal Office Action, dated Dec. 15, 2016.
U.S. Appl. No. 15/484,791, Alert Notifications Utilizing Broadcasted Telematics Data, filed Apr. 11, 2017.
U.S. Appl. No. 15/484,791, Nonfinal Office Action, dated Oct. 18, 2017.

\* cited by examiner

ANALYZING TELEMATICS DATA TO DETERMINE TRAVEL EVENTS AND CORRECTIVE ACTIONS

CROSS REFERENCE TO RELATED APPLICATIONS

This application is a continuation of, and claims the benefit of, U.S. patent application Ser. No. 16/002,107, filed Jun. 7, 2018 and entitled "Analyzing Telematics Data to Determine Travel Events and Corrective Actions", which is a continuation of and claims priority to U.S. patent application Ser. No. 15/787,311 (now U.S. Pat. No. 10,042,363), entitled "Analyzing Telematics Data to Determine Travel Events and Corrective Actions" and filed Oct. 18, 2017, which is a continuation of U.S. patent application Ser. No. 14/990,056 (now U.S. Pat. No. 9,836,062), filed Jan. 7, 2016, which claims the benefit of (1) U.S. Provisional Patent Application No. 62/105,468, entitled "Broadcasting Telematics Data To Nearby Mobile computing devices, Vehicles, And Infrastructure," filed Jan. 20, 2015, (2) U.S. Provisional Patent Application No. 62/113,749, entitled "Broadcasting Telematics Data To Nearby Mobile computing devices, Vehicles, And Infrastructure," filed Feb. 9, 2015, (3) U.S. Provisional Patent Application No. 62/204,749, entitled "Broadcasting Telematics Data To Nearby Mobile computing devices, Vehicles, And Infrastructure," filed Aug. 13, 2015, (4) U.S. Provisional Patent Application No. 62/207,561, entitled "Generating Alert Notifications By Broadcasting Telematics Data To Nearby Mobile computing devices, Vehicles, And Infrastructure," filed Aug. 20, 2015, (5) U.S. Provisional Patent Application No. 62/232,035 entitled "Generating Alert Notifications By Broadcasting Telematics Data To Nearby Mobile computing devices, Vehicles, And Infrastructure," filed Sep. 24, 2015, (6) U.S. Provisional Patent Application No. 62/232,045, entitled "Generating Alert Notifications By Broadcasting Telematics Data To Nearby Mobile computing devices, Vehicles, And Infrastructure," filed Sep. 24, 2015, (7) U.S. Provisional Patent Application No. 62/232,050, entitled "Determining Abnormal Traffic Conditions From A Broadcast Of Telematics Data Originating From Another Vehicle," filed Sep. 24, 2015, (8) U.S. Provisional Patent Application No. 62/232,054, entitled "Taking Corrective Action Based Upon Telematics Data Broadcast From Another Vehicle," filed Sep. 24, 2015, (9) U.S. Provisional Patent Application No. 62/232,065, entitled "Analyzing Telematics Broadcast To Determine Travel Events And Corrective Actions," filed Sep. 24, 2015, (10) U.S. Provisional Patent Application No. 62/232,075, entitled "Providing Insurance Discounts Based Upon Usage Of Telematics Data-Based Risk Mitigation And Prevention Functionality," filed Sep. 24, 2015, (11) U.S. Provisional Patent Application No. 62/232,083, entitled "Determining Corrective Actions Based Upon Broadcast Of Telematics Data Originating From Another Vehicle," filed Sep. 24, 2015, (12) U.S. Provisional Patent Application No. 62/232,090, entitled "Determining Corrective Actions Based Upon Telematics Data Broadcast From Another Vehicle," filed Sep. 24, 2015, (13) U.S. Provisional Patent Application No. 62/232,097, entitled "Generating Alert Notifications By Broadcasting Train Telematics Data To Nearby Mobile computing device s, Vehicles, And Infrastructure," filed Sep. 24, 2015, (14) U.S. Provisional Patent Application No. 62/247,334, entitled "Generating Alert Notifications By Broadcasting Train Telematics Data To Nearby Mobile computing device s, Vehicles, And Infrastructure," filed Oct. 28, 2015, and (15) U.S. Provisional Patent Application No. 62/250,286, entitled "Generating Alert Notifications By Broadcasting Train Telematics Data To Nearby Mobile computing devices, Vehicles, And Infrastructure," filed Nov. 3, 2015, the disclosure of each of which is hereby expressly incorporated by reference herein in its entirety.

FIELD OF THE DISCLOSURE

The present disclosure generally relates to generating alert notifications and, more particularly, to generating alert notifications based upon an analysis of collected telematics data, which may be used by other drivers.

BACKGROUND

Conventional telematics devices may collect certain types of data regarding vehicle operation. However, conventional telematics devices and data gathering techniques may have several drawbacks.

BRIEF SUMMARY

In one aspect, telematics data and/or geographic location data may be collected, monitored, measured, and/or generated by one or more computing devices associated with a vehicle. The telematics data may include various metrics that indicate the direction, speed, and/or motion of the vehicle in which the data is associated. The geographic location data may include a geographic location of the vehicle, such as latitude and longitude coordinates, for example. The one or more computing devices may include a mobile computing device positioned within the vehicle, an on-board computer integrated within the vehicle, and/or a combination of these devices working in conjunction with one another. The one or more computing devices may broadcast the telematics data and/or the geographic location data to one or more other devices.

The telematics data and/or the geographic location data may be received and/or processed by one or more other computing devices to determine whether an anomalous condition exists, such as a traffic accident, for example. These one or more other computing devices may be external computing devices (e.g., a remote server), another mobile computing device, a smart traffic infrastructure device (e.g., a smart traffic light), etc. If an anomalous condition is detected, the geographic location of the vehicle associated with the telematics data may be used as a condition to decide whether to generate an alert at (or send an alert notification to) the one or more other computing devices associated with nearby vehicles.

In one aspect, a computer-implemented method may be provided regarding using telematics (and/or other) data to provide telematics data-based risk mitigation or prevention functionality. The method may include (a) receiving telematics data, at or by (1) a mobile device associated with a driver, and/or (2) a smart vehicle controller of a vehicle associated with the driver, via wireless communication and/or data transmission; (b) analyzing or reviewing the telematics data, at or by the mobile device (or smart vehicle controller) to determine that a travel event exists (that is revealed by the telematics data) based upon the telematics data and/or a Global Positioning System (GPS) location of the travel event (such as revealed by the telematics data); (c) if the travel event exists, then further determining if the travel event presents an issue or problem for the driver (e.g., owner of the mobile device or smart vehicle, an insured driver of the vehicle, etc.), via the mobile device (or smart vehicle controller), such as by determining that the GPS location of the travel event is located along or on the current travel route of the vehicle, and/or in a vicinity or ahead of the current GPS location of the mobile device (or smart vehicle controller); and/or (d) if so, automatically taking a preventive or corrective action, at or via the mobile device (or smart vehicle controller) that alleviates a negative impact of the travel event on the driver and/or vehicle to facilitate safer and/or more efficient vehicle travel.

In another aspect, a computer-implemented method may be provided for using telematics (and/or other) data at a destination vehicle or device to provide telematics databased risk mitigation or prevention functionality. The method may include (a) receiving telematics data, at or by (1) a mobile device associated with a driver, and/or (2) a smart vehicle controller of a vehicle associated with the driver, via wireless communication and/or data transmission; (b) analyzing or reviewing the telematics data, at or by the mobile device (or smart vehicle controller) to determine that a travel event exists (that is revealed by the telematics data); (c) comparing a GPS location, at or by the mobile device (or smart vehicle controller), of the travel event (such as revealed by the telematics data) with a current GPS location or current travel route of the mobile device (and/or smart vehicle controller); (d) based upon the comparison, determining if the travel event presents an issue or problem for the driver of the vehicle, via the mobile device (or smart vehicle controller), such as by determining that the GPS location of the travel event is located along or on the current travel route of the vehicle, and/or in a vicinity (e.g., within a predetermined distance (such as 5 miles for highway travel, or 3 blocks for city street travel)) or ahead of the current GPS location of the mobile device (or smart vehicle controller); and/or (e) if so, automatically taking a preventive or corrective action, at or via the mobile device (or smart vehicle controller) that alleviates a negative impact of the travel event on the driver to facilitate safer and/or more efficient vehicle travel. The method may include additional, fewer, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
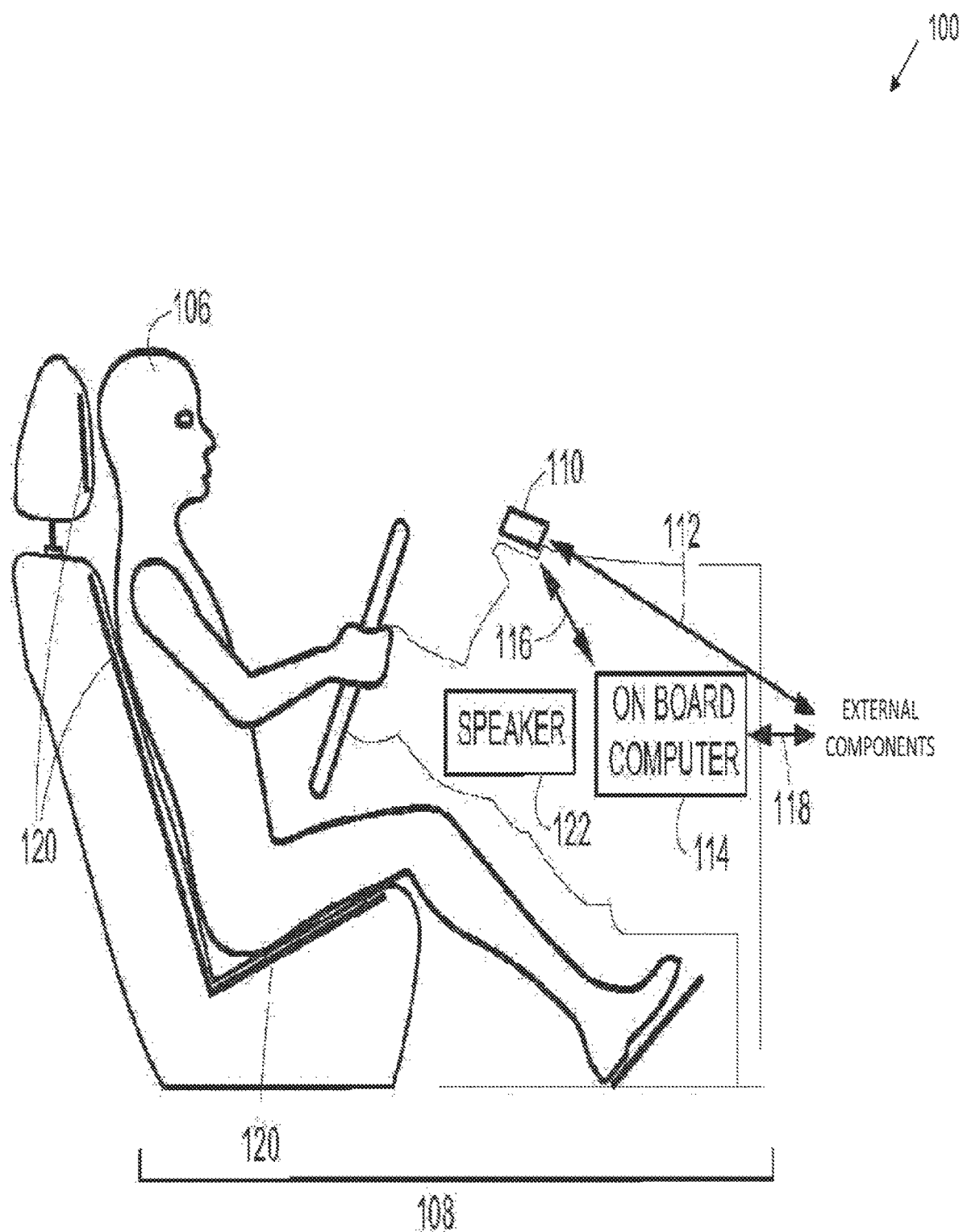
FIG. 1 illustrates a block diagram of an exemplary telematics collection system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition is detected at the location of a vehicle using one or more computing devices within or otherwise associated with the vehicle. If the detected anomalous condition may impact or affect another vehicle on the road, embodiments are described to generate and/or send alert notifications to other vehicles that may be so affected. As further described throughout the disclosure, the process of detecting anomalous conditions and whether they apply to other vehicles may be performed through an analysis geographic location data and/or telematics data broadcasted from one or more computing devices within or otherwise associated with one or more respective vehicles.

The present embodiments may relate to collecting, transmitting, and/or receiving telematics data; and may include a mobile device, a vehicle-mounted processor, computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily rerouted, unexpected bad weather, other drivers or vehicles, etc.

To address these and other problems, telematics data (and/or driver behavior or vehicle information) may be captured in real-time, or near real-time, by a mobile device of a vehicle driver (or passenger). The mobile device may be specifically configured for gathering, collecting, and/or generating telematics and/or other data as a vehicle is traveling.

For instance, the mobile device may be equipped with (i) various sensors and/or meters capable of generating telematics data (GPS unit, speed sensor, speedometer, odometer, gyroscope, compass, accelerometer, etc.) and/or (ii) an application, such as a Telematics Data Application or Telematics "App," that includes computer instructions and/or software modules stored in a non-transitory memory unit that control collecting and generating telematics and/or other data. The mobile device and/or the application (or Telematics App) may provide a software module, user interface, and/or interactive display screen configured to facilitate the data collection. The mobile device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or smart infrastructure—all of which may be equipped with its own Telematics App or other telematics related applications. The Telematics App may include other functionality, including the mobile device functionality discussed elsewhere herein.

Alternatively, the mobile device may remotely access a web page, such as via wireless communication with a remote server. The web page may provide the mobile device with the functionality to collect the telematics and/or other data as the vehicle is moving. Additionally or alternatively, the web page may allow the mobile device to upload or transmit data in real-time, or near real-time, to a mobile device of a second driver, a remote server, smart infrastructure, and/or another (smart) vehicle.

Additionally or alternatively, a smart vehicle controller or processor may be configured with the same functionality as that of the mobile device described above. For instance, a smart vehicle controller may include an application, software module, or computer instructions that provide for the telematics and/or other data collection and generation functionality discussed herein. The smart vehicle controller may be in wired or wireless communication with various ("smart" or "dumb") vehicle-mounted meters, sensors, and/ or detectors, such as speedometers, speed sensors, compasses, gyros, accelerometers, etc. that collect and/or generate telematics data and/or other data detailing or associated with vehicle operation, and/or driving or driver behavior.

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/ vehicle data in real-time as the vehicle is traveling, such as via a Telematics App running on the mobile device. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The mobile device itself (and/or Telematics App) may be configured to identify the type of traffic event and transmit the type of traffic event to other mobile devices, a remote server, smart vehicles, and/or smart infrastructure. In one embodiment, the mobile device (and/or Telematics App) may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

In one embodiment, a telematics application or software module (e.g., the Telematics App as discussed herein) may be designed to communicate with smart vehicles and smart infrastructure. An advantage of this is that for a vehicle owner that does not have a "smart" vehicle with wireless communication technology, the application and/or software module deployed on a smart phone or other mobile device may communicate with smart vehicles and infrastructure (and/or remote servers and other mobile devices). The telematics application and/or software module may be programmed to provide voice alerts: such as on a two lane road "do not pass-a vehicle is approaching" or "high speed vehicle is approaching to your left (or right);" "traffic light will turn in 10 seconds;" "turn left to find an open parking space;" "traffic is stopped 1.5 miles ahead;" "traffic has slowed to 20 mph 1.5 miles (or 2 blocks) ahead;" "recommended speed for turn ahead is 30 mph;" and/or "ice on bridge (or ramp) ahead."

As an example, a first mobile device may be traveling in a vehicle. The first mobile device may collect telematics data and/or other data, such as via a telematics application running on one or more processors mounted within the first mobile device. The first mobile device (and/or the telematics application) may detect a travel event from the data collected. For instance, the first mobile device (and/or the telematics application executing thereon) may determine that the vehicle is located on the highway, but the vehicle is moving slower than the posted speed limit. The first mobile device (and/or the telematics application) may then transmit the data collected and/or an associated message via wireless communication or data transmission to smart roadside infrastructure and/or nearby vehicles (or a second mobile device traveling within a nearby and second vehicle). The second mobile device (and/or a telematics application running thereon) may then, using the data received and/or message received from the first mobile device, generate an audible or visual warning or alert of the travel event, such as "Warning, congestion ahead," and/or "Recommend taking Exit 10 and traveling on Highway 12 for 5 miles until Exit 11 to avoid the congestion ahead." The second mobile device (and/or associated telematics application) may also be able to compare locations of the travel event with the current location of the second vehicle to determine if the travel event poses a potential obstacle to the second vehicle reaching its destination without interruption. Thus, the telematics data collected using a first mobile device (and/or a telematics application) and associated with a first driver may be used to alert a second driver (associated with the second mobile device) of a travel event and/or re-route the second vehicle to facilitate safer vehicle travel for the second driver and vehicle.

In one aspect, a mobile device (and/or the telematics application) may compare a vehicle's traveling speed with a known posted speed limit. If the vehicle's speed is below or above the posted speed by a certain threshold, for example, 10 or 20 miles-per-hour, then the mobile device may generate a warning and transmit the warning to roadside infrastructure and/or nearby mobile devices or vehicles. For example, the message may state "Slow moving vehicle in right hand lane ahead;" "High speed vehicle approaching from rear;" And/or "High speed vehicle approaching from ahead."

Other messages or alerts that may be generated from mobile devices (and/or telematics applications executing thereon), smart vehicle controllers, remote servers, and/or smart infrastructure and transmitted to a mobile device of a driver (and/or smart vehicle) may include "Construction 1 mile ahead;" "Rain (or Snow) 5 miles ahead;" "Detour 2 blocks ahead;" "Traffic light directly ahead will change from Green to Red starting in 5 seconds;" "Stranded vehicle on right side of road half a mile ahead;" "Recommend turning right at next intersection to avoid travel event 3 blocks ahead;" and/or other travel or traffic event-related messages.

An insurance provider may collect an insured's usage of the vehicle safety functionality provided herein, such as at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies (and/or premiums, rates, discounts, etc.) may be communicated to insurance customers for their review, modification, and/or approval—such as via wireless communication or data transmission from a remote server to a mobile device or the insured.

Telematics and Vehicle Navigation

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a mobile device of a first driver. The mobile device may be specifically configured to gather or generate telematics and/or other driver/vehicle data in real-time as the vehicle is traveling. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The mobile device itself may be configured to identify the type of traffic event and transmit the type of traffic event to other mobile devices, a remote server, smart vehicles, and/or smart infrastructure. In one embodiment, the mobile device may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Additionally or alternatively, the mobile device may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108. Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification. Telematics collection system 100 may include various data communication channels for facilitating data communications between the various hardware and software components and/or communications with one or more external components.

Various references are made to "telematics data" throughout this disclosure. As discussed herein, the telematics data may include any suitable number and type of information that may be used to identify various anomalous conditions, events, inconveniences, hazards, weather conditions, etc. Examples of telematics data provided herein may include, but is not limited to, data including sensor metrics or other information (e.g., image and/or video data) generated, collected, measured, and/or transmitted from an originating device, which may indicate various physical properties, conditions, the environment, or other information associated with the originating device. The originating device may be an originating mobile computing device located within an originating vehicle or the originating vehicle itself.

For example, the telematics data may indicate acceleration, deceleration, Global Positioning System (GPS) location, time, braking, data indicative of an originating vehicle turning, the heading and/or speed of the originating vehicle (e.g., GPS-determined speed, onboard vehicle sensor based speed, etc.) GPS latitude and longitude, a battery level of an originating mobile computing device located in the originating vehicle, telephone usage information associated with the originating device, angular velocity metrics, current road lane information associated with the originating vehicle, etc.

To accomplish this, telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device, such as a mobile device (e.g., smartphone, tablet, laptop, wearable electronics, phablet, pager, personal digital assistant (PDA), smart glasses, smart watch or bracelet, etc.), while on-board computer may implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics to one or more external components.

In some aspects, the external components may include another mobile computing device substantially similar to or identical to mobile computing device 110. In accordance with such aspects, mobile computing device 110 may additionally or alternatively be configured to receive geographic location data and/or sensor metrics broadcasted from another mobile computing device, the details of which are further discussed below. Mobile computing device 110 may be configured to determine, upon receiving the geographic location data and/or sensor metrics, whether an anomalous condition exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data and/or telematics data by communicating with one or more vehicle sensors that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, and/or motion of vehicle 108 via any number of suitable sensors, such as speedometer sensors, braking sensors, airbag deployment sensors, crash detection sensors, etc.

In one aspect, mobile computing device 110 and/or on-board computer 114 may operate independently of one another to generate geographic location data and/or telematics data, to receive geographic location data and/or telematics data broadcasted from another telematics collection system, to determine whether to generate one or more alerts, and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data and/or telematics data, to receive geographic location data and/or telematics data broadcasted from another telematics collection system, to determine whether to generate one or more alerts, and to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
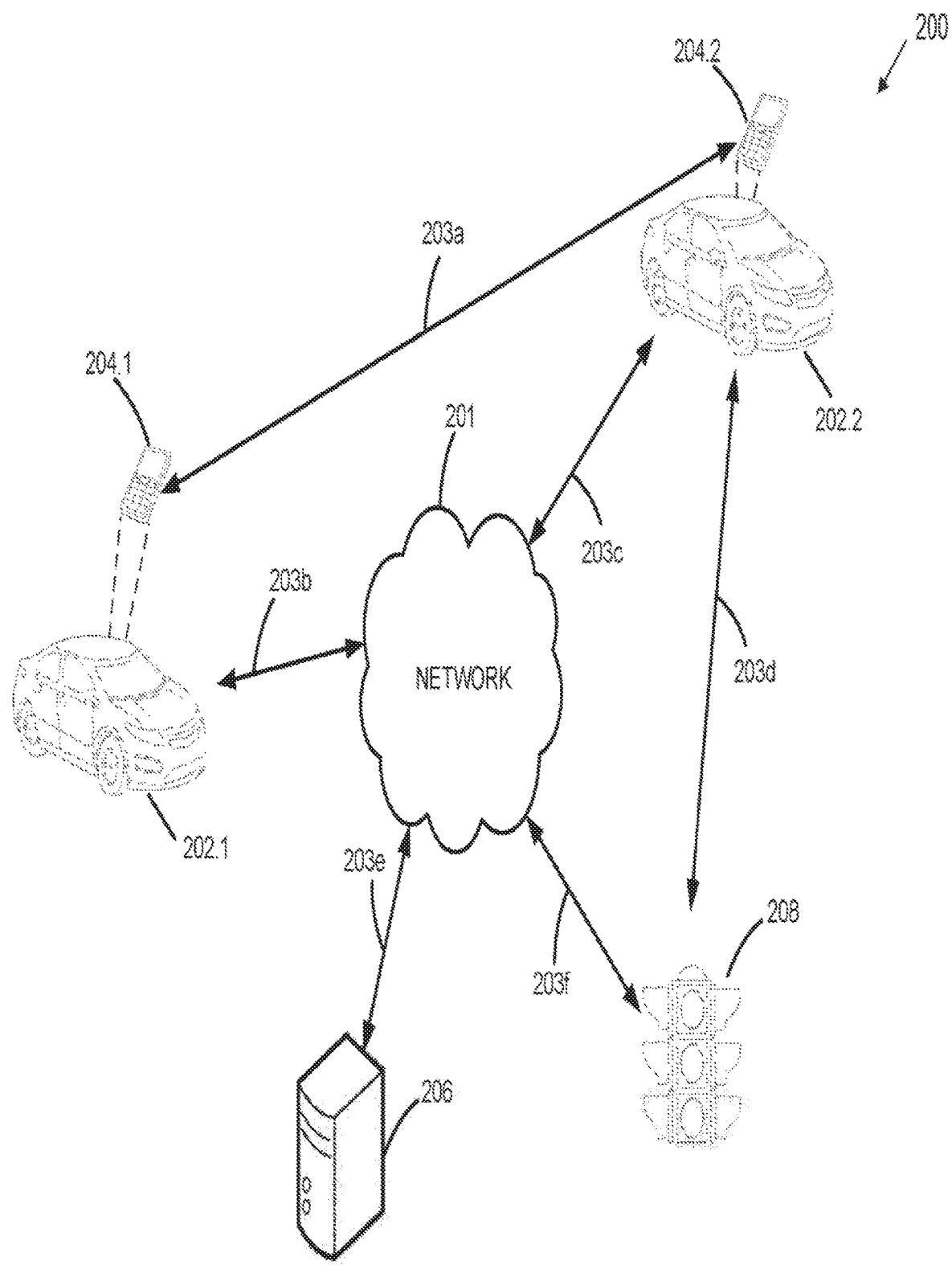
FIG. 2 illustrates a block diagram of an exemplary alert notification system 200 in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, and/or an infrastructure component 208. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Each of vehicles 202.1 and 202.2 may be configured for wireless inter-vehicle communication, such as vehicle-to-vehicle (V2V) wireless communication and/or data transmission.

Although alert notification system 200 is shown in FIG. 2 as including one network 201, two mobile computing devices 204.1 and 204.2, two vehicles 202.1 and 202.2, one external computing device 206, and/or one infrastructure component 208, various aspects include alert notification system 200 implementing any suitable number of networks 201, mobile computing devices 204, vehicles 202, external computing devices 206, and/or infrastructure components 208. For example, alert notification system 200 may include a plurality of external computing devices 206 and more than two mobile computing devices 204, any suitable number of which being interconnected directly to one another and/or via network 201.

In one aspect, each of mobile computing devices 204.1 and 204.2 may be configured to communicate with one another directly via peer-to-peer (P2P) wireless communication and/or data transfer. In other aspects, each of mobile computing devices 204.1 and 204.2 may be configured to communicate indirectly with one another and/or any suitable device via communications over network 201, such as external computing device 206 and/or infrastructure component 208, for example. In still other aspects, each of mobile computing devices 204.1 and 204.2 may be configured to communicate directly and indirectly with one and/or any suitable device, which may be concurrent communications or communications occurring at separate times.

Each of mobile computing devices 204.1 and 204.2 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.1, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and/or 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d) and/or indirectly (e.g., via radio links 203c and 203f via network 201) using any suitable communication protocols.

Mobile computing devices 204.1 and 204.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Network 201 may be implemented as any suitable network configured to facilitate communications between mobile computing devices 204.1 and/or 204.2 and one or more of external computing device 206 and/or infrastructure component 208. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure public internet, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203f may represent wired links, wireless links, or any suitable combination thereof.

In aspects in which mobile computing devices 204.1 and 204.2 communicate directly with one another in a peer-to-peer fashion, network 201 may be bypassed and thus communications between mobile computing devices 204.1 and 204.2 and external computing device 206 may be unnecessary. For example, in some aspects, mobile computing device 204.1 may broadcast geographic location data and/or telematics data directly to mobile computing device 204.2. In this case, mobile computing device 204.2 may operate independently of network 201 to determine whether an alert should be generated at mobile computing device 204.2 based upon the geographic location data and the telematics data. In accordance with such aspects, network 201 and external computing device 206 may be omitted.

However, in other aspects, one or more of mobile computing devices 204.1 and/or 204.2 may work in conjunction with external computing device 206 to generate alerts. For example, in some aspects, mobile computing device 204.1 may broadcast geographic location data and/or telematics data, which is received by external computing device 206. In this case, external computing device 206 may be configured to determine whether an alert should be sent to mobile computing device 204.2 based upon the geographic location data and the telematics data.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1 and/or 204.2. For example, mobile computing device 204.1 and/or 204.2 may collect data (e.g., geographic location data and/or telematics data) as described herein, but may send the data to external computing device 206 for remote processing instead of processing the data locally. In such embodiments, external computing device 206 may receive and process the data to determine whether an anomalous condition exists and, if so, whether to send an alert notification to one or more mobile computing devices 204.1 and 204.2.

In one aspect, external computing device 206 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing device 206 may facilitate the receipt of telematics data or other data from one or more mobile computing devices 204.1-204.N, which may be associated with insurance customers and/or running a Telematics App, as further discussed below with reference to FIG. 3.

In aspects in which external computing device 206 facilitates communications with an insurer computing system (or is part of such a system), data received from one or more mobile computing devices 204.1-204.N may include logon credentials which may be verified by external computing device 206 or one or more other external computing devices, servers, etc. These logon credentials may be associated with an insurer profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 204.1-204.N may allow external computing device 206 to uniquely identify each insured customer and/or whether each identified insurance customer has installed the Telematics App. Furthermore, any data collected from one or more mobile computing devices 204.1-204.N may be referenced to each insurance customer and/or any insurance policies associated with each insurance customer for various insurance-related purposes.

For example, as further discussed below with reference to FIG. 3, the one or more mobile computing devices 204.1-204.N may broadcast, in addition to or as part of the telematics data, data indicative of whether a Telematics App has been installed and/or usage data indicative of how often a driver uses the Telematics App functionality while driving. Of course, similar or identical data may be received from a vehicle as opposed to the mobile computing device located in the vehicle. That is, the same functions discussed below with reference to FIG. 3 regarding the Telematics App installed and executed on a mobile computing device may also (or alternatively) be installed and executed as part of a vehicle's integrated computer functions, as previously discussed with reference to FIG. 1 above.

In various aspects, an insurer may leverage data regarding whether an insured customer has installed a Telematics App or how often the Telematics App is used while driving to calculate, adjust, and/or update various insurance pricing for an automotive insurance policy or other suitable insurance policy. For example, an insurer may adjust insurance premiums, rates, discounts, points, programs, etc., based upon the insured having the functionality discussed herein and/or the amount that the insured uses the functionality discussed herein.

In addition, external computing device 206 may facilitate the communication of the updated insurance policies, premiums, rates, discounts, etc., to insurance customers for their review, modification, and/or approval—such as via wireless communication or data transmission to one or more mobile computing devices 204.1-204.N. For example, an insurer may provide an initial discount for an insured customer installing the Telematics App and logging in with the Telematics App. To continue this example, because the alert notifications provided by the Telematics App may reduce the likelihood of a collision or other damage occurring to the vehicle or the driver, use of the Telematics App may function to mitigate or prevent driving risks upon which an insurance policy is partially based. Therefore, an insurer may provide an additional discount that increases with the insured customer's usage of the Telematics App while driving.

In some aspects, external computing device 206 may facilitate indirect communications between one or more of mobile computing devices 204.1-204.2, vehicles 202.1-202.N, and/or infrastructure component 208 via network 201 or another suitable communication network and/or wireless link. For example, external computing device 206 may receive telematics data from an originating mobile computing device 204.1 via radio link 203b and relay the telematics data to a destination mobile computing device 204.2 and/or to vehicle 202.2 via radio link 203c.

Infrastructure component 208 may be implemented as any suitable type of traffic infrastructure component configured to receive communications from and/or to send communications to other devices, such as external computing devices 204.1, 204.2 and/or external computing device 206, for example. For example, infrastructure component 208 may be implemented as a traffic light, a railroad crossing light, a construction notification sign, a roadside display configured to display messages, a billboard display, etc.

In some aspects, infrastructure component 208 may be implemented as one or more "smart" infrastructure components, which may be configured to communicate with one or more other devices directly and/or indirectly. Examples of smart infrastructure components may include, for example, smart stop signs, smart street signs, smart toll booths, smart road-side equipment, smart markers, smart reflectors, etc. In various aspects, infrastructure component 208 may be configured to communicate directly with mobile computing device 204.2 via link 203.d and/or with mobile computing device 204.1 via links 203b and 203f utilizing network 201. To provide another example, infrastructure component 208 may communicate with external computing device 206 via links 203e and 203f utilizing network 201.

Similar to external computing device 206, one or more infrastructure components 208 may facilitate indirect communications between one or more of mobile computing devices 204.1-204.N, vehicles 202.1-202.N, and/or external computing device 206 via network 201 or another suitable communication network and/or wireless link. For example, one or more infrastructure components 208 may receive telematics data from an originating mobile computing device 204.2 via radio link 203*d* and relay the telematics data to a destination mobile computing device 204.1 and/or to vehicle 202.1 via radio links 203*b* and 203*f*.

In some aspects, infrastructure component 208 may be configured to receive geographic location data and/or telematics data from one or more other devices and to process this data to determine whether an anomalous condition has been detected and whether the detected anomalous condition satisfies a threshold distance condition with respect to infrastructure component 208. The threshold distance condition may include, for example, the geographic location of the anomalous condition being within a threshold radius of infrastructure component 208, on the same road serviced by infrastructure component 208, etc. If so, infrastructure component 208 may perform one or more relevant actions such as displaying one or more relevant messages to notify drivers in the vicinity, to modify traffic patterns, to change traffic light timing, to redirect traffic, etc.

In other aspects, infrastructure component 208 may receive data indicating that an alert is to be generated and/or the type of alert that is to be generated. In accordance with such aspects, one or more of mobile computing devices 204.1, 204.2 and/or external computing device 206 may make the determination of whether an anomalous condition exists and is within a threshold distance of infrastructure component 208. If so, the data received by infrastructure component 208 may be indicative of the type of anomalous condition, the location of the anomalous condition, commands to cause infrastructure component 208 to perform one or more acts, the type of acts to perform, etc.

To provide some illustrative examples, if infrastructure component 208 is implemented as a smart traffic light, infrastructure component 208 may change a traffic light from green to red (or vice-versa) or adjust a timing cycle to favor traffic in one direction over another. To provide another example, if infrastructure component 208 is implemented as a traffic sign display, infrastructure component 208 may display a warning message that the anomalous condition (e.g., a traffic accident) has been detected ahead and/or on a specific road corresponding to the geographic location data.

In additional aspects, other vehicles may play a role in the one or more alert notifications. To provide an illustrative example, an emergency vehicle (e.g., an ambulance, fire truck, etc.) may be dispatched to the scene of an accident. In such a case, the emergency vehicle may be configured to broadcast one or more signals that cause one or more of mobile computing devices 204.1-204.2 to generate one or more alert notifications and/or infrastructure component 208 to change to a different state. These signals may be broadcasted from a mobile computing device carried by emergency response personnel and triggered upon the vehicle approaching (e.g., within a threshold distance) a geographic location associated the vehicle accident. Additionally or alternatively, the signals may be broadcasted by any suitable device mounted in or otherwise associated with the emergency response vehicle.

To provide another illustrative example, a train may broadcast one or more signals indicating that the train is approaching a railroad crossing, which is received by one or more of mobile computing devices 204.1-204.2 and/or infrastructure component 208 and results in the mobile computing devices generating one or more alert notifications and/or the infrastructure component 208 changing to a different state. Similar to the emergency vehicle example above, the broadcasted signal may be transmitted upon the train approaching (e.g., within a threshold distance) of the crossing location, and may be transmitted from a mobile computing device and/or equipment mounted on or otherwise associated with the train.

Additional vehicles such as emergency response vehicles and trains are not illustrated in FIG. 2 for purposes of brevity. However, the signals transmitted from these vehicles may be transmitted in accordance with any suitable communication protocol directly and/or indirectly to one or more or mobile computing devices 204.1-204.2 and/or infrastructure component 208. For example, the signals may be transmitted to directly to infrastructure component 208, indirectly to one more mobile computing devices 204.1-204.2 via network 201 and/or remote computing device 206, etc.

Exemplary End-User/Destination Devices

The following details regarding the determination of an anomalous condition are explained in this section with reference to computing device 300, which may be a mobile computing device or "mobile device" (e.g., smart phone, laptop, tablet, phablet, smart watch, wearable electronics, etc.). In the present aspect, computing device 300 may be implemented as any suitable computing device, such as a mobile computing device (e.g., mobile computing device 100, as shown in FIG. 1). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., remote computing device 206 or infrastructure component 208, as shown in FIG. 2).

Depending upon the implementation of computing device 300, the methods and processes utilized to determine the existence of anomalous conditions may be performed locally, remotely, or any suitable combination of local and remote processing techniques.

Figure 3:
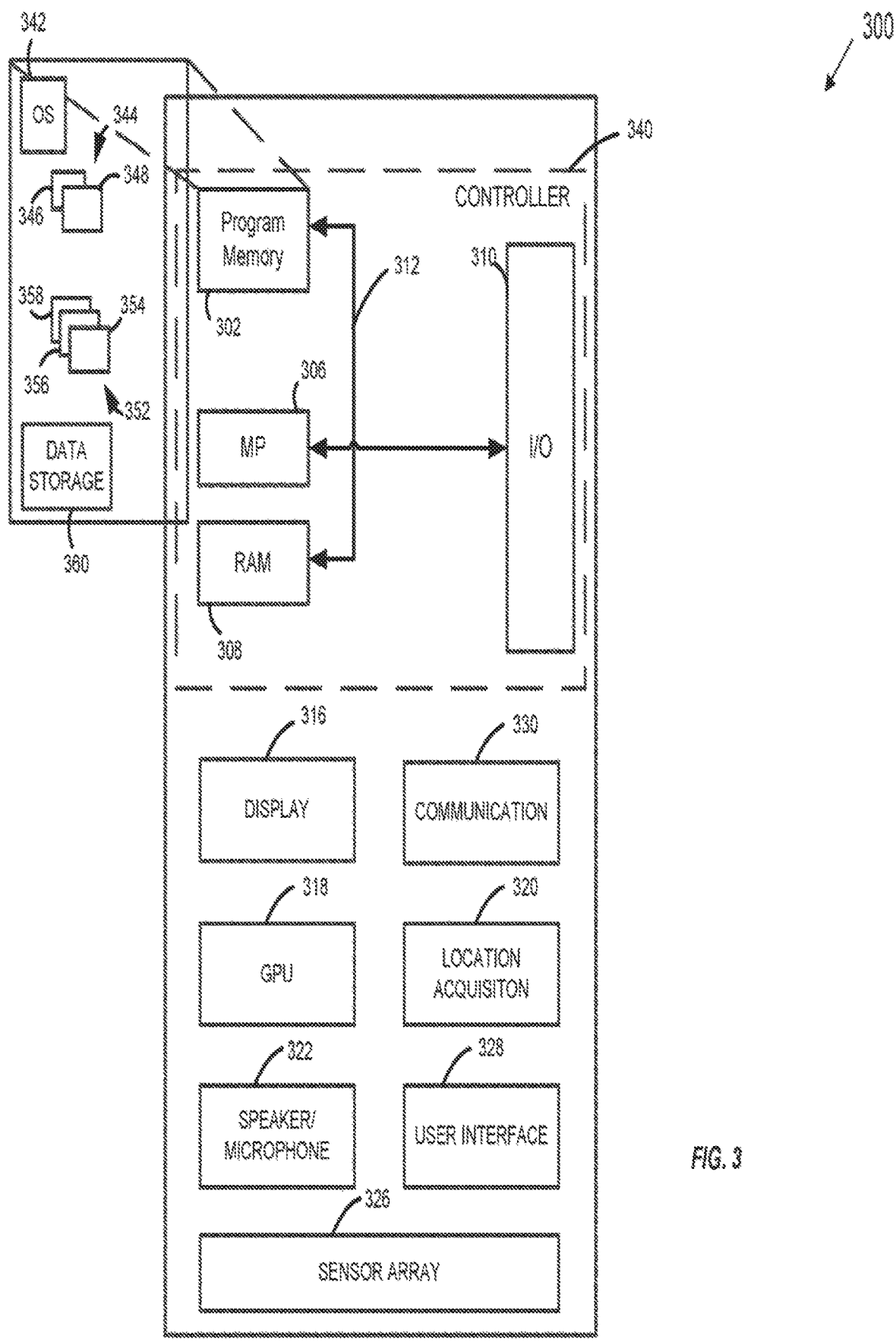
FIG. 3 illustrates a block diagram of an exemplary computing device or mobile device 300 in accordance with an exemplary aspect of the present disclosure.

FIG. 3 illustrates a block diagram of an exemplary computing device or mobile device 300 in accordance with an exemplary aspect of the present disclosure. Computing device 300 may be implemented as any suitable computing device configured to (1) monitor, measure, generate, and/or or collect telematics data; (2) broadcast the geographic location data and/or the telematics data to one or more external components, such as via wireless communication and/or data transmission; (3) receive geographic location data and/or telematics data broadcasted from another device, such as via wireless communication and/or data transmission; (4) determine whether an anomalous condition exists at the geographic location indicated by the geographic location data based upon the telematics data; (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 340 may be configured to communicate with additional data storage mechanisms that are not shown in FIG. 3 for purposes of brevity (e.g., one or more hard disk drives, optical storage drives, solid state storage devices, etc.) that reside within or are otherwise associated with computing device 300.

Program memory 302 may store data used in conjunction with one or more functions performed by computing device 300 to facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between mobile computing device 204.1 and (i) one or more networks (e.g., network 201), (ii) other mobile computing devices (e.g., mobile computing device 204.2), (iii) external computing devices (e.g., external computing device 206), (iv) vehicles (e.g., vehicle 108), (v) vehicle on-board computers (e.g., on-board computer 114), infrastructure components (e.g., infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MIPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data and/or telematics data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other mobile computing devices, networks, external computing devices, smart infrastructure components, etc. As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle in which it is carried (e.g., vehicle 108) via BLUETOOTH communications.

Communication unit 330 may be configured to broadcast data and/or to receive data in accordance with any suitable communications schedule. For example, communication unit 330 may be configured to broadcast geographic location data and/or telematics data every 15 seconds, every 30 seconds, every minute, etc. As will be further discussed below, the geographic location data and/or telematics data may be sampled in accordance with any suitable sampling period. Thus, when broadcasted by communications unit 330 in accordance with a recurring schedule, the geographic location data and/or telematics data may include a log or collection of the geographic location data and/or telematics data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data has been sampled since the last transmission, which will be further discussed below with regards to sensor array 326. Controller 340 may determine whether has been sampled since the last transmission by, for example, analyzing a memory address range (e.g., in data storage 360, RAM 308, etc.) associated with the storage of the telematics data and comparing the contents of this buffer to a known range of valid values.

To provide another example, aspects include communication unit 330 being additionally or alternatively configured to only broadcast telematics data when computing device 300 is connected to a power source (e.g., an in-vehicle charger). To provide still another example, aspects include communication unit 330 being additionally or alternatively configured to only broadcast telematics data when communication unit 330 is connected to and/or communicating with a device identified as a vehicle. This may include, for example, identifying a BLUETOOTH connection as a valid vehicle to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft" keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, and/or direction associated with movements of computing device 300 and, thus, a vehicle in which computing device 300 is positioned. Additionally or alternatively, sensor array 326 may be configured to communicate with one or more portions of computing device 300 to measure, collect, and/or generate one or more sensor metrics from one or more non-sensor sources, which will be further discussed below.

To generate one or more sensor metrics, sensor array 326 may include, for example, one or more cameras, accelerometers, gyroscopes, magnetometers, barometers, thermometers, proximity sensors, light sensors, Hall Effect sensors, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In an aspect, sensor array 326 may include one or more cameras or other image capture devices. In accordance with such aspects, the one or more cameras that are part of sensor array 326 may be mounted or otherwise positioned on computing device 300 such that, when computing device 300 is docked, cradled, or otherwise mounted within a vehicle, images may be captured from this vantage point. For example, when computing device 300 is mounted within a vehicle, a camera implemented by sensor array 326 may function as a dashboard camera, capturing images and/or video data of various objects outside of the vehicle from this vantage point. Additionally or alternatively, computing device 300 may capture audio data with the image and/or video data via speaker/microphone 322.

In various aspects, computing device 300 may begin to capture data upon detecting that it has been placed in a cradle, and otherwise not capture data in such a manner. This detection may occur, for example, via one or more conditions being satisfied. For example, computing device 300 may utilize one or more sensors (e.g., an accelerometer that is part of sensor array 326) to determine that computing device 300 has changed orientation to horizontal (as is common when docked in a vehicle), that computing device 300 is communicating via BLUETOOTH with the vehicle, that the vehicle is moving above a threshold speed, etc. Aspects include any suitable number of conditions, upon being satisfied, triggering computing device 300 to start collecting telematics data, images, audio, video, etc., via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a motion, speed, direction, and/or g-force associated with vehicle braking, acceleration, and cornering at a rate of 15 Hz, 30 Hz, 60 Hz, etc., which may be the same sampling rate at which other sensor metrics are sampled or different sampling rates.

To provide another example, sensor array 326 may be configured to implement one or more gyroscopes to improve the accuracy of the measured one or more sensor metrics and to determine whether the phone is in use or stationary within a vehicle. To provide yet another example, sensor array 326 may implement a compass (magnetometer) to determine a direction or heading of a vehicle in which computing device 300 is located. Additional examples of sensor metrics may be those applicable to the determination of a current lane the vehicle is in, which may be derived, for example, via an image analysis of image and/or video data obtained via one or more cameras that may be integrated as part of sensor array 326.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In various aspects, sensor array 326 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or a smaller resolution).

Additionally or alternatively, sensor array 326, location acquisition unit 320, and/or communication unit 330 may log or otherwise measure various metrics or other data that may be used by controller 340 to determine how often the functionality of the Telematics Application is being utilized when a vehicle is being driven. For example, sensor array 326 may log the time when telematics data is being collected, when the Telematics Application is running, and/or when the Telematics Application has been started. To provide additional examples, communication unit 330 may store data indicative of a BLUETOOTH connection status of computing device 300. To provide yet another example, location acquisition unit 320 may store and/or log the changes in geographic location of computing device 300 over time.

In various aspects, controller 340 may determine how often a driver uses the Telematics App based upon any suitable combination of the aforementioned data. For example, the BLUETOOTH connection status may be leveraged to determine whether computing device 300 is located in a vehicle. To provide another example, the changes in the geographic location data over time may be utilized to determine whether computing device 300 has exceeded a threshold speed for a threshold duration of time. In this way, a determination may be made whether computing device 300 is located in a vehicle while the vehicle is being driven.

Various aspects include the aforementioned data being leveraged to calculate a usage amount in which a user utilizes the Telematics App while driving. For example, the usage amount may be based upon a total proportion of time (e.g., 80% of the time while driving, the functionality provided by the Telematics App is enabled). To provide another example, the usage amount may be mileage-based (e.g., 90% of the miles driven are done so with the functionality of the Telematics App available to the driver). As discussed above, this usage data may be sent to an insurer or other third party via a telematics data transmission or a separate transmission (e.g., one that is received at external computing device 206) and used to set and/or adjust an insurance policy, premium, or discount for the insured customer. Furthermore, the usage data may be utilized by an external computing device to generate a usage-based discount that is tied to an amount that the capability of receiving and analyzing the telematics data, or generating appropriate alerts or recommendations, is used.

In one aspect, sensor array 326 may sample one or more sensor metrics based upon one or more conditions being satisfied. For example, sensor array 326 may determine, based upon gyroscope sensor metrics (e.g., angular velocity metrics), communication with controller 340, etc., whether computing device 300 is in use. If computing device 300 is in use (e.g., when implemented as a mobile computing device) then the movement of computing device 300 within the vehicle may not truly represent the vehicle motion, thereby causing sensor metrics sampled during this time to be erroneous. Therefore, aspects include sensor array 326 sampling the one or more sensor metrics when computing device 300 is not in use, and otherwise not sampling the one or more sensor metrics.

In one aspect, sensory array 326 may include one or more cameras and/or image capture devices. When sensory array 326 is implemented with one or more cameras, these cameras may be configured as any suitable type of camera configured to capture and/or store images and/or video. For example, when computing device 300 is mounted in a vehicle, the camera may be configured to store images and/or video data of the road in front of the vehicle in which it is mounted, and to store this data to any suitable portion of program memory 302 (e.g., data storage 360). Controller 340 and/or MP 306 may analyze this data to generate one or more local alerts, to transmit signals indicative of detected alerts to one or more other devices, etc., which is further discussed below with reference to the execution of anomalous condition detection routine 358.

Again, the telematics data broadcasted by computing device 300 may include one or more sensor metrics. However, the telematics data may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes store, the Google Play Store, the Windows Phone Store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

In an aspect, alert notification application 346 may function as a Telematics Application (or "App") which is downloaded and installed on computing device 300 by a user via a suitable third-party software store and/or portal (e.g., Apple iTunes, Google Play, the Windows Store, etc.).

To provide an illustrative example, alert notification application 344 may include instructions for performing tasks such as determining a geographic location of computing device 300 (e.g., via communications with location acquisition unit 330), monitoring, measuring, generating, and/or collecting telematics data, broadcasting the geographic location data and/or the telematics data to one or more external devices, receiving geographic location data and/or telematics data from another computing device, determining whether an anomalous condition exists based upon the geographic location data and/or the telematics data, generating one or more alerts indicative of the determined anomalous condition, receiving user input, facilitating communications between computing device 300 and one or more other devices in conjunction with communication unit 330, etc.

To provide another example, aspects include computing device 300 being configured to capture image and/or video data while cradled in a dock or otherwise mounted within a vehicle, as previously discussed. In accordance with various aspects, this data capture may be facilitated, for example, by instructions stored in alert notification application 346 being executed by controller 340 and/or MP 306. In various aspects, alert notification application 346 may facilitate computing device 300 capturing image, audio, and/or video data at any suitable sampling rate (e.g., once every second, 5 times per second, etc.) and storing this data to any suitable portion of the mobile computing device (e.g., data storage 360). Aspects include data sampling processes occurring as background operations to allow other applications to be run on computing device 300 (e.g., navigation applications) while telematics data and/or images, video, and/or audio data is collected by computing device 300.

Software applications 344 may include a web browser 348. In some embodiments (e.g., when computing device 300 is implemented as a mobile computing device), web browser 348 may be a native we browser application, such as Apple's Safari®, Google Android™ mobile web browser, Microsoft Internet Explorer® for Mobile, Opera Mobile™, etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 204.2, as shown in FIG. 2). This web page information may be utilized in conjunction with alert notification application 346 to perform one or more function of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data. In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330).

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates). In some aspects, geographic location determination routine 356 may facilitate generating and/or storing geographic location data locally via one or more components of computing device 300 (e.g., via location acquisition unit 320 and/or communication unit 330). In other aspects, geographic location determination routine 356 may facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists based upon the telematics data, the geographic location data, and/or image and/or video data captured by one or more cameras or other imaging devices. An anomalous condition may include any suitable condition that indicates a deviation from normal traffic patterns. For example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. Furthermore, because each vehicle may sample and/or broadcast geographic location data and/or telematics data in real time, the anomalous conditions may be detected with minimal delay as they occur.

Although the speed of the vehicle may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide an illustrative example based upon a traffic accident, if a first vehicle carrying a first computing device 300 is slowed down due to a traffic accident, then the one or more sensor metrics sampled by sensor array 326 will indicate the speed of the first vehicle over a period of time. If the one or more sensor metrics indicate that the first vehicle's speed is below the speed limit by some threshold amount or proportion thereof (e.g., 20 mph in a 55 mph zone, 50% of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected. This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, and/or the geographic location data associated with the detected anomalous condition. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data and/or geographic location data but not notification data. In accordance with such aspects, upon being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices, the second computing device 300 may ignore the telematics data, thereby saving processing power and battery life. However, if the second computing device 300 determines that the geographic location data indicates a potentially relevant anomalous condition, the second computing device 300 may further process the telematics data and take the appropriate relevant action if an anomalous condition is found (e.g., issue an alert notification, generate an alert, display a warning message, etc.).

To provide yet another example by further modifying the details in the previous two, aspects may include computing device 300 broadcasting the telematics data and geographic location data to an external computing device (e.g., to external computing device 206 via network 201, as shown in FIG. 2). In addition, the second computing device 300 associated with the second vehicle may likewise broadcast telematics data and geographic location data to the external computing device. In accordance with such aspects, the external computing device may determine whether an anomalous condition exists and is relevant to each of the first and second devices 300 based upon a geographic relationship between the first and second devices 300. When relevant, external computing device may be configured to send alert notifications to the first and/or second devices 300, which may include any suitable type of communications such as push notifications, a short messaging service (SMS) message, an email, a notification that used in conjunction with the OS running on each receptive computing device 300, etc. Upon receiving the notification from the external computing device, the first and/or second computing device 300 may generate an alert indicating a description of the anomalous condition and/or its location.

The geographic relationship between two or more devices 300 may be utilized in several ways to determine the relevance of the anomalous condition. For instance, current speed, location, route, destination, and/or direction of travel of a first vehicle (collecting and/or associated with the telematics data) may be individually or collectively compared with current speed, location, route, destination, and/or direction of travel of a second vehicle traveling on the road. As one example of the geographic relationship, a first vehicle location (and associated with a travel or traffic event) may be compared with a second vehicle location, current route, and/or destination to determine whether the second vehicle should divert course or slow down to alleviate the risk of the second vehicle being involved in a collision or a traffic jam (as a result of the travel or traffic event that is identified by the telematics data).

As another example of the geographic relationship, a radius from one vehicle or a line-of-sight distance between vehicles may be utilized and compared to a threshold distance. For example, if computing device 300 is implemented as an external computing device and determines a line-of-sight distance between a first and second vehicle to be less than a threshold distance (e.g., a half mile, one mile, etc.), then the external computing device may issue an alert notification to both vehicles. In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, etc.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

To provide another illustrative example, as previously discussed, one or more cameras integrated as part of sensor array 326 may store image and/or video data from a vantage point within a vehicle in which computing device 300 is mounted to act as a dashboard camera. In accordance with such aspects, anomalous condition detection routine 358 may include instructions, that when executed by controller 340, facilitate the analysis of the image and/or video data to detect one or more anomalous conditions that may pose an immediate threat, hazard, and/or inconvenience to the driver and/or other drivers in the vicinity. These anomalous objects may also be identified as a traffic event, as previously discussed.

In various aspects, any suitable type of object recognition and/or image recognition analysis may be performed upon captured image data to detect objects in the path of the vehicle, such as animals, pedestrians, other vehicles, potholes, etc. Furthermore, the captured mage data may be analyzed to identify other anomalous traffic conditions, events, etc., such as vehicle traffic, congestion, road construction, weather conditions, etc.

Upon detecting an anomalous object, computing device 300 may issue the appropriate alert via display 316 and/or sound an alarm via speaker/microphone 322. Additionally or alternatively, computing device 300 may, upon detecting an anomaly (e.g., a travel event), broadcast one or more signals via communication unit 330, which are received directly or indirectly by other mobile computing devices. Again, these other mobile computing devices may then generate alert notifications locally when close to the geographic location of computing device 300 where the signal was broadcasted. Aspects in which the detected anomalous condition is shared in this manner may be particularly useful when the identified anomaly is likely to threaten other drivers using the same road, such as potholes or objects blocking the roadway, for example.

The one or more signals transmitted via communication unit 330 may identify the type of travel event, the location of the travel event, a description of the travel event, etc. For example, once an anomaly is detected, the transmission may include geographic location coordinates or any other suitable identifier such that the location of a detected anomaly may be determined upon being received by another computing device. This location data may be, for example, included as part of the telematics data, as a separate data transmission that is broadcasted simultaneously or at a different time than the telematics data transmission, etc.

Although FIG. 3 depicts controller 340 as including one program memory 302, one MP 306, and one RAM 308, controller 340 may include any suitable number of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Exemplary Screenshots of an Alert Notification Application

Figures 4A, 4B:
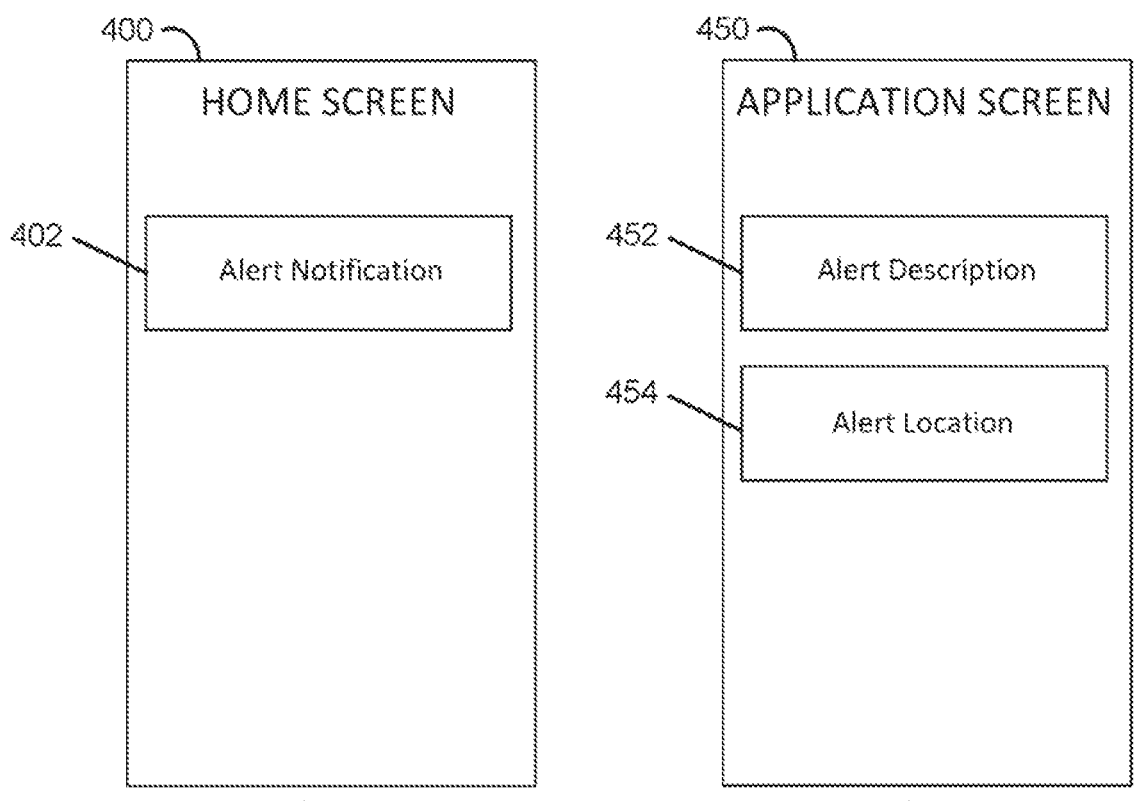
FIG. 4A illustrates an exemplary mobile computing device home screen 400 in accordance with an exemplary aspect of the present disclosure.
FIG. 4B illustrates an exemplary mobile computing device application screen 450 in accordance with an exemplary aspect of the present disclosure.

FIG. 4A illustrates an example mobile computing device home screen 400 in accordance with an exemplary aspect of the present disclosure. In various aspects, home screen 400 is displayed on a mobile computing device, such as mobile computing device 110 or mobile computing devices 204.1-204.2, as shown in FIGS. 1 and 2, respectively. In accordance with such aspects, home screen 400 may be displayed as part of a device display, such as display 316, for example, as shown in FIG. 3.

Home screen 400 may be displayed as a default screen on a mobile computing device. In one embodiment, home screen 400 may facilitate a lock screen of a mobile computing device. Lock screens may be typically displayed when a user locks the mobile computing device to enter a lock screen mode (e.g., by pressing a physical button). Additionally or alternatively, the mobile computing device may revert to the lock screen when inactive for a threshold period of time. The lock screen prevents a user from using a portion of the mobile computing device functionality. For example, a lock screen might prevent a mobile computing device in a user's pocket from accidentally sending SMS messages or phone calls.

Although lock screens typically limit the functionality of the device when enabled, it may be desirable for certain applications to provide a user with some functionality via the lock screen. For example, if the mobile computing device is used to play music, a lock screen overlay could allow a user to change tracks, pause a track, or adjust the volume level without unlocking the phone. In accordance with some aspects, alert notification 402 may be displayed as part of a home screen and/or lock screen of a mobile computing device, as shown in FIG. 4A.

Although alert notification 402 may be displayed as part of home screen 400, other aspects include alert notification 402 being displayed as part of a notification system separate from home screen 400. For example, some mobile phone operating systems (e.g., the Android OS) implement a universal "pull-down" notification system where all incoming notifications are displayed. In these notification systems, new notifications are initially previewed in a notification bar at the top of the phone display, and a user may pull down the notification bar (e.g., by using a swiping gesture) to access the details of any received notifications. In one aspect, alert notification 402 may be displayed as part of a notification bar type notification.

As previously discussed with reference to FIG. 3, a device running the alert notification application may be configured to determine whether an anomalous condition has been detected and/or to receive alert notifications sent by other devices that have done so. In accordance with such aspects, alert notification 402 is a block diagram representation of what may be generated upon detection of an anomalous condition and/or receiving an indication that an anomalous condition has been detected. Alert notification 402 may be implemented as any suitable graphic, label, text, description, etc., to convey this to a user. In one embodiment, alert notification 402 may be interactive and may facilitate a user selection via an appropriate gesture (e.g., swiping, tapping, etc.).

FIG. 4B illustrates an example mobile computing device application screen 450 in accordance with an exemplary aspect of the present disclosure. In various aspects, application screen 450 may be displayed on a mobile computing device, such as mobile computing device 110 or mobile computing devices 204.1-204.2, as shown in FIGS. 1 and 2, respectively. In accordance with such aspects, application screen 450 may be displayed as part of a device display, such as display 316, for example, as shown in FIG. 3.

In one aspect, application screen 450 may be displayed upon a user selecting alert notification 402 from home screen 400. Application screen 450 may include an alert description 452 and an alert location 454. Alert description 452 is a block diagram representation of one or more descriptions of the alerts related to the detected anomalous condition. Alert description 452 may be implemented as any suitable graphic, label, text, description, etc., to convey this to a user. For example, alert description 452 may include a text description such as "slow traffic ahead," "traffic at standstill ahead," "unpaved road ahead," "potential icy conditions ahead," "pulled over vehicle ahead," etc.

Alert location 454 is a block diagram representation of one or more descriptions of the location of the anomalous condition. Alert location 454 may be implemented as any suitable graphic, label, text, description, etc., to convey this to a user. For example, alert location 454 may include a directional compass indicating a direction towards the anomalous condition from the mobile computing device displaying application screen 450. To provide additional examples, alert location 454 may include a distance to the anomalous condition, a map overlaid with the location of the mobile computing device displaying application screen 450 to indicate the position of the mobile computing device in relation to the anomalous condition, the threshold distances and/or geofences used to determine the relevance of the anomalous condition, etc.

Exemplary Method of Generating Alert Notifications

Figure 5:
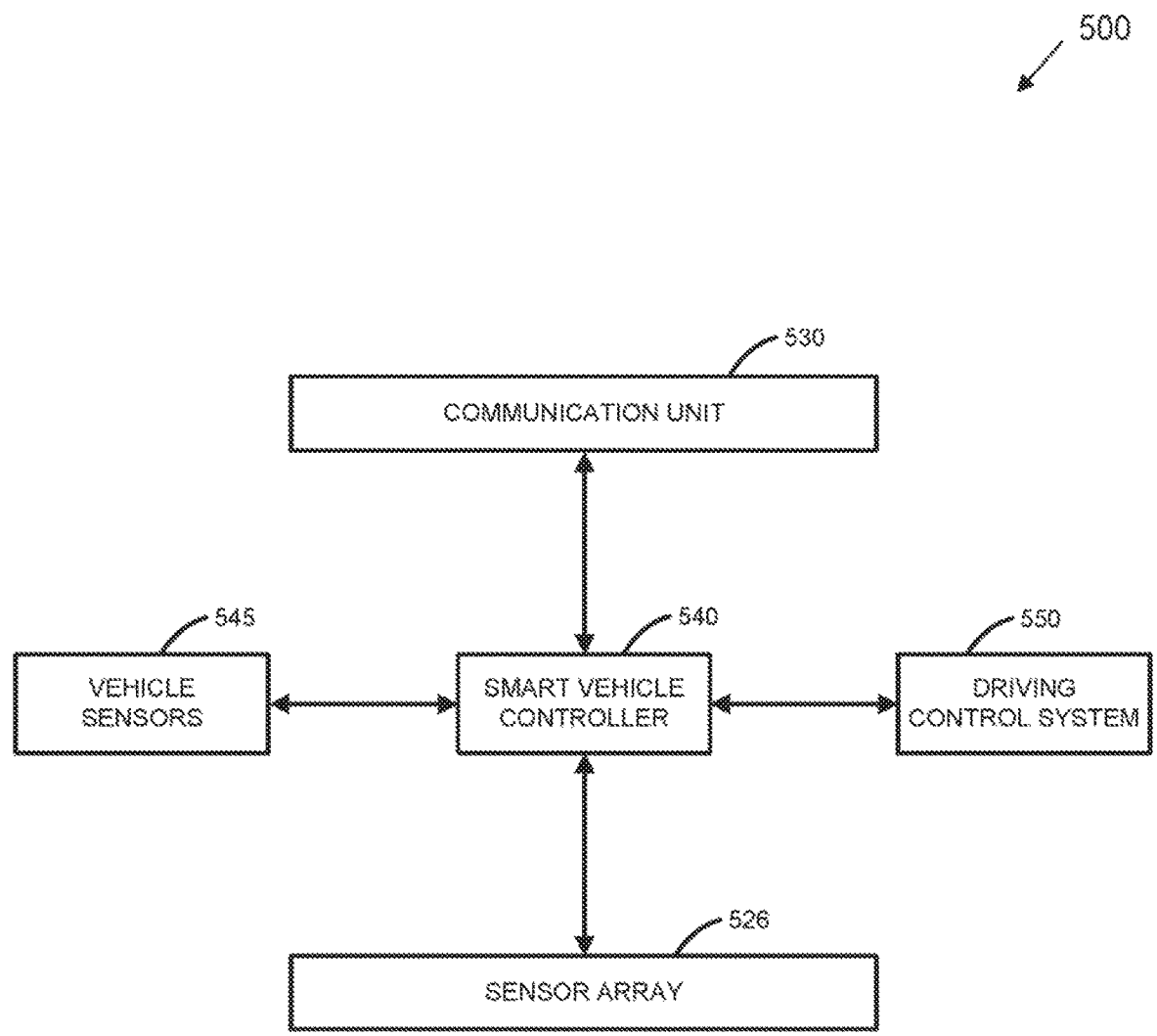
FIG. 5 illustrates a block diagram of an exemplary smart vehicle control system 500 in accordance with an exemplary aspect of the present disclosure.

FIG. 5 illustrates a block diagram of an exemplary smart vehicle control system 500 in accordance with an exemplary aspect of the present disclosure. In the present aspect, smart vehicle control system 500 may be implemented as any suitable computing device, such as a computing device that is integrated as part of a smart vehicle to facilitate autonomous driving and/or other smart driving functions. For example, smart vehicle control system may be integrated as part of one or more vehicles 201.1-202.N, as shown in FIG. 2, to provide such vehicles with such functions. Smart driving functions may include, for example, the generation, receipt, collection, storage, and/or transmission of telematics data, such as previously discussed above with reference to on board computer 114, as shown in FIG. 1.

Smart vehicle control system 500 may include a sensor array 526, a communication unit 530, a smart vehicle controller 540, one or more vehicle sensors 545, and/or a driving control system 550, one or more of which may be configured to communicate with one another to receive data from, and send data to, one another. Smart vehicle control system 500 may include additional, less, or alternate functionality, including that discussed elsewhere herein, and/or discussed with reference to mobile computing devices, remote servers, and/or smart infrastructure.

In an aspect, sensor array 526, communication unit 530, and smart vehicle controller 540 may have a similar architecture, implementation, and/or perform similar functions as sensor array 326, communication unit 330, and controller 340, respectively, as previously discussed above with reference to FIG. 3. Therefore, only differences between sensor array 526, communication unit 530, and smart vehicle controller 540, as shown in FIG. 5, and sensor array 326, communication unit 330, and controller 340, as shown in FIG. 3, will be further discussed herein.

For instance, it will be appreciated that some differences between sensor array 526, communication unit 530, and smart vehicle controller 540, as shown in FIG. 5, and sensor array 326, communication unit 330, and controller 340, as shown in FIG. 3, respectively, may be due to differences between applications and design requirements of mobile computing devices and vehicles. For example, smart vehicle controller 540 may include one or more microprocessors, program memory, RAM, I/O interfaces, etc. However, smart vehicle controller 540 may include faster microprocessors, additional memory, faster memory controllers, etc., than that of controller 340 to account for the additional processing and speed requirements associated with the higher processing functions of vehicles, particularly smart vehicles. To provide another example, smart vehicle controller 540 may include one or more processors specifically designed for adaptive vision processing at high speeds and/or utilizing parallel processing techniques to facilitate autonomous or semi-autonomous driving.

Likewise, sensor array 526 may have additional or alternative sensors and/or meters than sensor array 326. Sensor array 526 may additionally or alternatively include any suitable number and/or type of sensors and/or meters to facilitate autonomous or semi-autonomous driving. Examples of sensors included in sensor array 526 may include, for example, radar systems configured to operate at any suitable number or range of wavelengths (e.g., millimeter-wavelengths), LiDAR, ultrasonic sensors, etc.

Vehicle sensors 545 may include, for example, any suitable number and/or type of sensors and/or meters integrated as part of the vehicle in which smart vehicle control system 500 is installed or otherwise implemented. For example, vehicle sensors 545 may generate one or more sensor metrics or other data that is part of the telematics data that is stored, collected, and/or broadcasted from smart vehicle control system 500 (e.g., via communication unit 530).

In some aspects, vehicle sensors 545 may sample sensor metrics or other information that is included as part of the telematics data, as discussed elsewhere herein, while sensor array 526 may be implemented as one or more sensors associated with autonomous driving functions. Thus, in aspects in which smart vehicle control system 500 is implemented as part of a non-autonomous vehicle, vehicle sensors 545 and sensor array 526 may be implemented as a single sensor array.

Communication unit 530 may be configured to transmit telematics data including one or more sensor metrics or other information generated by vehicle sensors 545 and/or sensor array 526, which may be received by other mobile computing devices, other smart vehicles, smart infrastructure, and/or external computing devices, as discussed elsewhere herein. Additionally or alternatively, communication unit 530 may be configured to receive telematics data from other mobile computing devices, other smart vehicles, smart infrastructure, and/or external computing devices, as discussed elsewhere herein.

When transmitting telematics data, smart vehicle controller 540 may be configured to format the sensor metrics and/or other information generated, collected, and/or measured by vehicle sensors 545 and/or sensor array 526 into a telematics data broadcast, determine whether the telematics data should be updated, and/or broadcast the telematics data. Additionally or alternatively, smart vehicle controller 540 may be configured to analyze the telematics data to identify one or more anomalous conditions (e.g. travel events, traffic events), and/or alerts, to generate one or more messages associated with the telematics data and/or detailing the type and/or extent of an identified anomaly and/or alert, etc.

Furthermore, smart vehicle controller 540 may be configured to broadcast or otherwise direct a transmission of the message via data transmission and/or wireless communication (e.g., via communication unit 530) to another computing device (such as a mobile computing device, another vehicle, a remote server, smart infrastructure, etc.). As further discussed herein, devices receiving the telematics data and/or message may utilize the telematics data to perform various functions, issue alerts to drivers, etc. In this way, the telematics data and/or messages transmitted by smart vehicle control system 500 may facilitate safer travel for another vehicle and/or another driver.

Similar to the other devices described above (e.g., computing device 300), when receiving telematics data, smart vehicle controller 540 may be configured to perform various functions such as issuing alerts to drivers when the telematics data contains a warning message and/or identifying an anomalous condition by analyzing the received telematics data.

Driving control system 550 may be implemented with any suitable number and/or type of driving controllers to control the direction, movement, and/or speed of the vehicle in which smart vehicle control system 500 is installed. For example, driving control system 550 may include various drive-by-wire interfaces to facilitate controlling the speed of the vehicle and to turn the vehicle without user input. To provide an additional example, driving control system may include various braking controllers and/or transmission controllers to slow the vehicle and to shift the vehicle into different gears.

In accordance with one aspect, smart vehicle controller 540 may communicate with one or more components of driving control system 550 in response to telematics data, information, and/or messages received via communication unit 530. For example, if the telematics data indicates a road hazard at a certain location and/or in a certain road lane, then smart vehicle controller 540 may issue one or more commands to driving control system 550 to steer the vehicle into a clear lane, thus avoiding the road hazard.

Driving control system 550 may include different types of feedback components and/or control systems based upon the type of vehicle in which smart vehicle control system 500 is implemented or installed. For example, driving control system 550 may include various interfaces and/or control systems to facilitate autonomous driving in conjunction with smart vehicle controller 540. But if smart vehicle control system 500 is implemented in a non-autonomous vehicle, driving control system may work in conjunction with smart vehicle controller 540 to receive one or more signals and/or data associated with traditional driving functions (e.g., manual acceleration, steering, braking, etc.).

Regardless of the type of vehicle in which smart vehicle control system 500 is implemented, smart vehicle controller 500 may work in conjunction with driving control system 550 to support any suitable number and/or type of driver feedback. To provide this feedback, driving control system 550 may include any suitable number and/or type of displays, user interfaces, speakers, buzzers, etc.

For example, driving control system 550 may include various feedback components to provide visual and/or auditory feedback regarding the operation of the vehicle and/or information regarding anomalous conditions, alerts, warnings, recommendations, etc., which may be based upon an analysis of telematics data. Again, the telematics data may be received from another computing device (e.g., via communication unit 530) and/or generated and analyzed locally at smart vehicle control system 500.

To provide another example, smart vehicle controller 540 may include one or more memory units configured to store cartographic and/or map data. In response to user input received via a user interface implemented by driving control system 550, smart vehicle controller 540 may generate, calculate, and/or display travel routes, which may provide navigational guidance to a driver. Furthermore, smart vehicle controller 540 may perform functions associated with the determination of whether an identified anomaly (e.g., a traffic event, travel event, abnormal condition, etc.), which has been determined from an analysis of received telematics data from another device, is relevant to the vehicle in which smart vehicle control system 500 is implemented.

This determination of relevance may be made, for example, by comparing a location (e.g., geographic coordinates included in a telematics data transmission) to the current location of the vehicle in which smart vehicle control system 500 is implemented to determine whether the locations are within a threshold distance of one another. The determination may also be made, for example, when the identified anomaly or other abnormal condition is located along a current travel route (e.g., ahead by some threshold distance in a direction of travel on the same road in which the vehicle is moving). If so, aspects include smart vehicle controller 540 automatically performing various preventative and/or corrective actions based upon how the relevance of the identified anomaly is determined. For example, smart vehicle controller 540 may issue a visual and/or audible alert via driving control system 550, calculate and display a new travel route via driving control system 550 that avoids the location of the identified event, etc.

In some aspects, the preventative and/or corrective actions may be issued only when it is determined that an identified anomaly is relevant, and is otherwise not issued. For example, aspects include an identified anomaly that is not along a current route for the vehicle in which smart vehicle control system 500 is implemented not causing an alarm to be sounded and/or the route to be adjusted, even if the location of the anomaly is otherwise nearby. In this way, the preventive or corrective action may alleviate or avoid a negative impact of the abnormal travel condition on the driver and/or the vehicle in which smart vehicle control system 500 is implemented to facilitate safer or more efficient vehicle travel. Additional details of the preventive or corrective action that may be facilitated by smart vehicle control system 500 (or another suitable computing system) are further discussed below with reference to FIG. 5.

Again, as discussed elsewhere herein, anomalous condition may be based upon (and/or determined from telematics data that reveals) abnormal traffic conditions, congestion, road construction, and/or weather conditions, etc.

Method of Using Telematics Data at a Destination Vehicle

Figure 6:
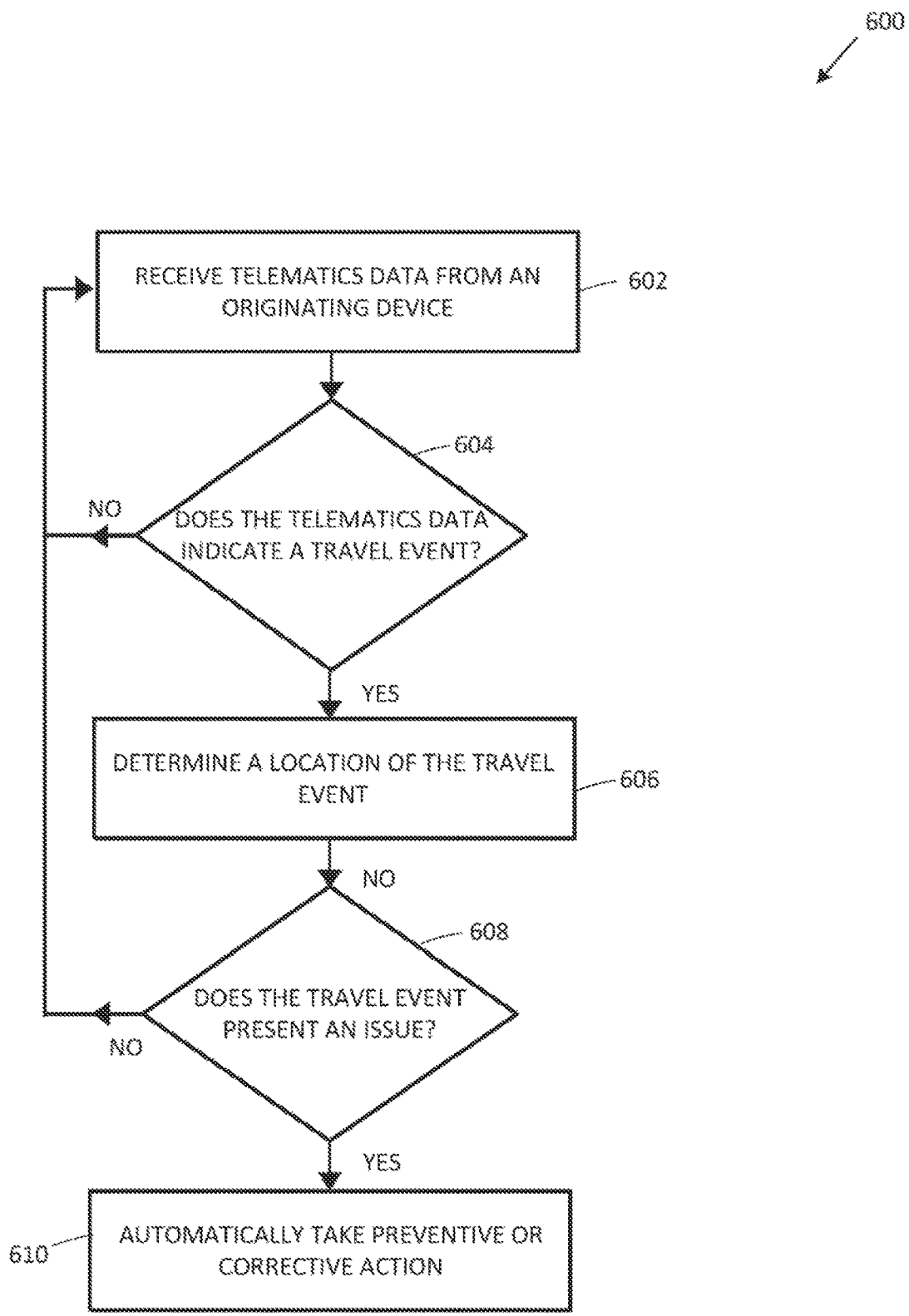
FIG. 6 illustrates an exemplary computer-implemented method 600 for receiving and analyzing telematics and/or other data at a destination mobile device/vehicle to facilitate safer driving.

FIG. 6 illustrates an exemplary computer-implemented method 600 for receiving and analyzing telematics and/or other data at a destination mobile device/vehicle to facilitate safer driving. In the present aspect, the method 600 may be implemented by any suitable computing device (e.g., mobile computing devices 204.1 and 204.2, as shown in FIG. 2, computing device 300, as shown in FIG. 3, smart vehicle controller 540, as shown in FIG. 5, etc.). Method 600 may include additional, less, or alternate steps, including those discussed elsewhere herein and/or discussed with reference to mobile computing devices, remote servers, and/or smart infrastructure.

For example, in aspects in which the method 600 is performed by a mobile computing device, the method 600 may be performed by one or more processors, applications, and/or routines, such as any suitable portion of controller 340, software applications 344, and/or software routines 352, for example, as shown in FIG. 3. To provide another example, in aspects in which the method 600 is performed by a smart vehicle controller, the method 600 may be performed by any suitable combination of one or more hardware, processors, applications, and/or routines working in conjunction with and/or implemented by the smart vehicle controller (e.g., communication unit 530, smart vehicle controller 540, driving control system 550, etc.).

The method 600 may start when one or more processors of a destination device receive telematics data from an originating device (block 602). The originating device may include, for example, a mobile computing device located in an originating vehicle or a smart vehicle controller located in the originating vehicle, either of which (or both) may be associated with a driver, when applicable. In either case, the originating device may sample, generate, measure, and/or transmit the telematics data, which may include, for example, latitude and longitude coordinates or another indication of the location and/or operation of the originating device (e.g., GPS coordinates, acceleration data, braking data, speed data, and/or heading data associated with the originating vehicle, etc.).

In the present aspect, the device receiving the telematics data from the originating device (e.g., a destination device) may include, for example, a mobile computing device located in a vehicle or a smart vehicle controller located in a vehicle, either of which (or both) may also be associated with a driver, when applicable (block 602).

Method 600 may include one or more processors of the destination device analyzing the telematics data to determine whether a travel event exists (block 604). Again, the travel event may include an event at any location, area, and/or region that may present a potential hazard and/or an inconvenience to the destination device or driver, such as anomalous travel events, anomalous travel conditions, weather-related phenomena, extreme weather conditions, high traffic conditions, traffic congestion, road construction, etc., as well as other examples that are discussed throughout the disclosure.

For example, method 600 may include one or more processors of the destination device analyzing the telematics data to determine whether a notification has been received indicating the existence of an abnormal travel event at some location (block 604). In other words, the destination device may analyze the telematics data itself and/or any suitable portion of the transmission in which the telematics data is sent to attempt to identify an alert, indication, and/or message regarding an abnormal travel event that has already been identified by an originating device (block 604).

To provide another example, method 600 may include one or more processors of the destination device analyzing the telematics data to determine whether an abnormal travel event exists at some location based upon an analysis of the telematics data (block 604). One or more processors of the destination device may determine whether a travel event exists based upon any suitable analysis techniques (block 604). For example, the destination device may store or access data (e.g., via communications with an external computing device) that includes an indication of speed limits on various roads, typical travel times on various roads, and/or typical traffic flow rates on various roads at different times of the day. The destination device may correlate the location of the originating device, which may be included in the telematics data, to a particular road. The destination device may then determine, based upon the speed of the originating vehicle at that location, whether the telematics data indicates a travel event (block 604).

To provide an illustrative example, if an originating device is travelling at a speed on a road that is greater than a threshold amount below the posted speed limit for a threshold duration of time, then an abnormal travel event may be identified at that location. To provide another example, if an originating device is travelling on a road at a particular speed that is greater than a threshold speed below a typical traffic speed associated with that road, then a traffic event may be identified at that location.

Furthermore, aspects include the destination device determining whether a travel event exists via matching one or more sensor metrics included in the telematics data to those indicative of a vehicle collision, crash, rollover, etc. (block 604). For example, accelerometer metrics may indicate a sudden deceleration of the originating vehicle within a window of time that is consistent with a collision.

If a travel event is identified, method 600 may continue to determine a location of the travel event (block 606). Otherwise, method 600 may revert back to receiving telematics data (block 602) and continuing to analyze newly received telematics data for the existence of travel events (block 604).

Method 600 may include one or more processors of the destination device determining a location of an identified travel event (block 606). This may include, for example, analyzing the telematics data and/or data transmitted with the telematics data to identify the location of the travel event that was generated by the originating device. In the case where the location of the originating device was determined using the telematics to identify the existence of a travel event (block 604) this step may optionally be performed as part of such an analysis instead of as a separate block as shown in FIG. 6.

For example, the originating device may insert geographic coordinates that were sampled at the same time the telematics data was generated and embed these geographic coordinates within the telematics data transmission (or as part of the telematics data itself). Thus, by correlating timestamps associated with the condition leading to the identification of a travel event to the geographic coordinates generated at this same time, the location of the travel event may be determined (block 606).

To provide another example, a third computing device (e.g., a remote server, a smart infrastructure component, etc.) may determine the location of the originating device when the telematics data is received and add, append, or otherwise include location data as part of the telematics data and/or telematics data transmission. Aspects in which the location data is added by another computing device may be particularly useful, for example, when it is desirable to offload processing and/or to transmit the telematics data at a faster rate than would otherwise be possible by waiting for an originating computing device to accurately ascertain its geographic location. Regardless of how the location data is generated, method 600 may include identifying, extracting, and/or otherwise determining the location of the travel event using the location data (block 606).

To provide another example, the location of the travel event may be averaged from multiple originating devices. That is, one or more processors associated with the destination device (or a remote server) may receive telematics data from several originating devices. The geographic location of each of these originating devices may be used to ascertain an overall area of impact of a travel event. To provide an illustrative example, the geographic coordinates of several originating devices may form a geofence boundary of coordinates that define an area associated with the identified location of the travel event (block 606). Aspects in which the location of several originating devices are utilized in this manner may be particularly useful, for example, when a remote server relays telematics data to the destination device, as the geofenced boundary may be calculated by the remote server and then relayed to the destination device with the telematics data. In this way, the remote server may offload this processing task and allow the destination device to identify the received geofence boundary as the location of the travel event (block 606).

The method 600 may include one or more processors of the destination device determining whether the abnormal travel event that was identified (block 604) presents an issue to the driver or the vehicle associated with the destination device (block 608). As discussed above with reference to FIG. 5, this determination may be made in accordance with any suitable techniques. For example, the destination device may compare the location of the abnormal travel event to the current location of the destination vehicle. If these two locations are within a threshold or predetermined distance of one another, the destination vehicle may identify the abnormal travel event as one that may present an issue (block 608).

To provide another example, the location of the abnormal travel event may be compared to a route or road upon which the destination vehicle is currently traveling. If the location of the abnormal travel event is on the road or along the route on which the destination vehicle is travelling (e.g., ahead and in a direction of travel on the same road in which the vehicle is moving), then the destination vehicle may identify the abnormal travel event as one that may present an issue (block 608).

If the abnormal travel condition is relevant to the destination device or otherwise presents an issue, aspects include one or more processors of the destination device automatically taking a preventive or corrective action (block 610). Otherwise, method 600 may revert back to continuing to receive notifications from the originating device (or monitoring for such transmissions) (block 602).

Method 600 may include automatically taking preventive or corrective action (block 610). For example, once an abnormal travel event is identified that presents an issue to the driver or vehicle, method 600 may include the destination device automatically taking preventive or corrective action that is based upon, for example, the type of travel event, the type of destination vehicle, and/or the capabilities of the destination vehicle (block 610).

For example, upon identifying the travel event, the destination vehicle may generate an alert, present a visual alert, provide an audible alert, determine, generate, and/or receive (e.g., via communications with an external computing device) an alternate travel route that avoids the location of the travel event, present and/or display the alternative travel route that avoids the location of the travel event (e.g., the GPS location of the travel event and/or the identified location of the originating vehicle), provide audio driving directions for the destination vehicle to travel along the alternate travel route, etc. (block 610).

To provide another example, if the destination vehicle is an autonomous (or semi-autonomous) vehicle, upon identifying the travel event, the destination vehicle may not only generate an alternate travel route that avoids a location of the travel event, but may additionally automatically direct the destination vehicle to take the alternative travel route by driving itself along the alternate route (block 610).

In this way, method 600 may alleviate a negative impact of the travel event upon the driver of the destination vehicle or the destination vehicle itself to facilitate safer and/or more efficient travel.

Method of Analyzing Telematics Data Using Geographic Location Comparisons

Figure 7:
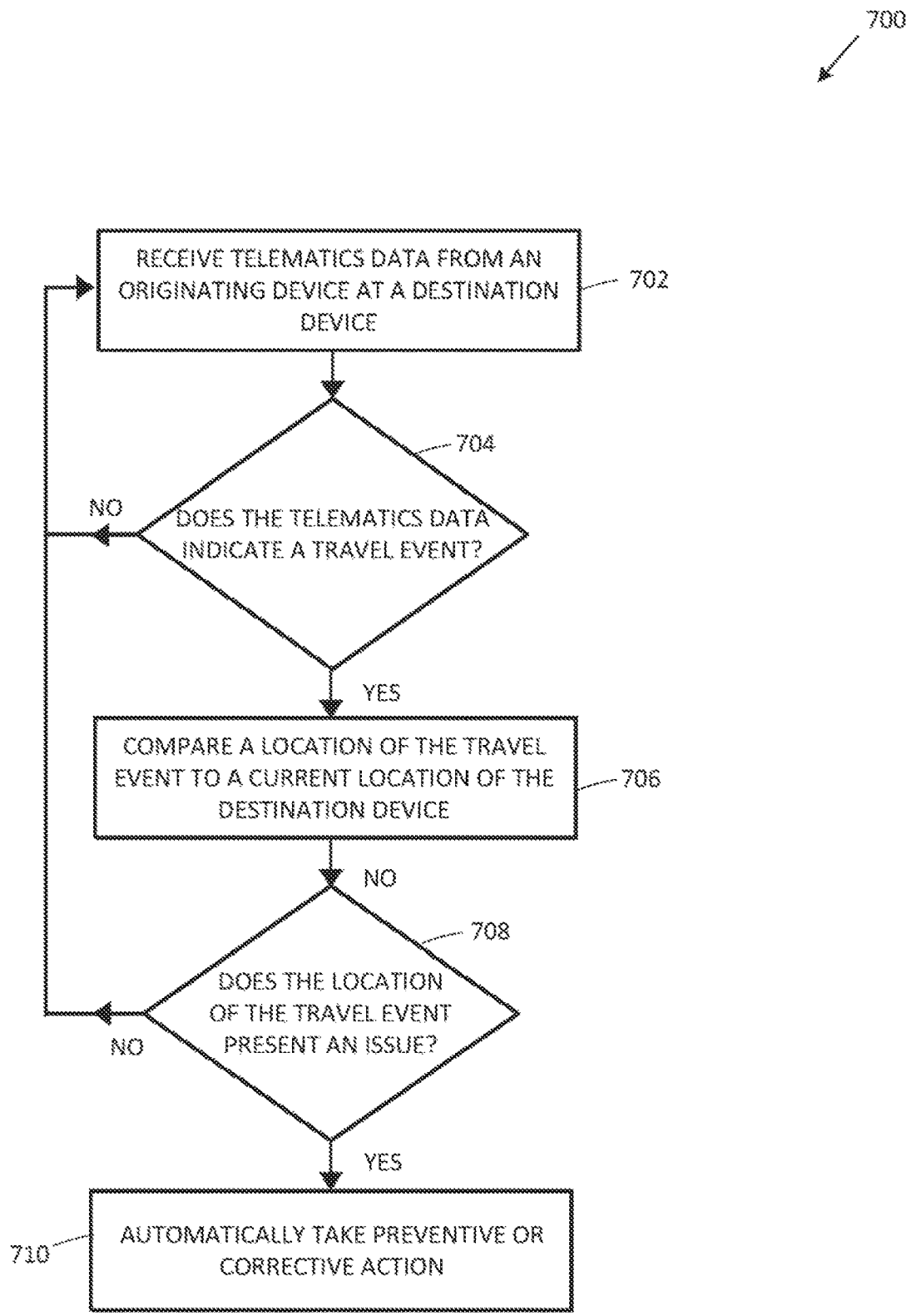
FIG. 7 illustrates an exemplary computer-implemented method 700 for receiving and analyzing telematics and/or other data at a destination mobile device/vehicle to facilitate safer driving.

FIG. 7 illustrates an exemplary computer-implemented method 700 for receiving and analyzing telematics and/or other data at a destination mobile device/vehicle to facilitate safer driving. In the present aspect, the method 700 may be implemented by any suitable computing device (e.g., mobile computing devices 204.1 and 204.2, as shown in FIG. 2, computing device 300, as shown in FIG. 3, smart vehicle controller 540, as shown in FIG. 5, etc.). Method 700 may include additional, less, or alternate steps, including those discussed elsewhere herein and/or discussed with reference to mobile computing devices, remote servers, and/or smart infrastructure.

For example, in aspects in which the method 700 is performed by a mobile computing device, the method 700 may be performed by one or more processors, applications, and/or routines, such as any suitable portion of controller 340, software applications 344, and/or software routines 352, for example, as shown in FIG. 3. To provide another example, in aspects in which the method 700 is performed by a smart vehicle controller, the method 700 may be performed by any suitable combination of one or more hardware, processors, applications, and/or routines working in conjunction with and/or implemented by the smart vehicle controller (e.g., communication unit 530, smart vehicle controller 540, driving control system 550, etc.).

The method 700 may start when one or more processors of a destination device receive telematics data from an originating device (block 702). The originating device may include, for example, a mobile computing device located in the originating vehicle or a smart vehicle controller located in the originating vehicle, either of which (or both) may be associated with a driver, when applicable. In either case, the originating device may sample, generate, measure, and/or transmit the telematics data, which may include, for example, latitude and longitude coordinates or another indication of the location and/or operation of the originating device (e.g., GPS coordinates, acceleration data, braking data, speed data, and/or heading data associated with the originating vehicle, etc.).

In the present aspect, the device receiving the telematics data from the originating device (e.g., a destination device) may include, for example, a mobile computing device located in a vehicle or a smart vehicle controller located in a vehicle, either of which (or both) may also be associated with a driver, when applicable (block 702).

Method 700 may include one or more processors of the destination device analyzing the telematics data to determine whether a travel event exists (block 704). Again, the travel event may include an event at any location, area, and/or region that may present a potential hazard and/or an inconvenience to the destination device or driver, such as anomalous travel events, anomalous travel conditions, weather-related phenomena, extreme weather conditions, high traffic conditions, traffic congestion, road construction, etc., as well as other examples that are discussed throughout the disclosure.

For example, as discussed above with reference to FIG. 6, method 700 may include one or more processors of the destination device analyzing the telematics data to determine whether a notification has been received indicating the existence of an abnormal travel event at some location and/or one or more processors of the destination device analyzing the telematics data to determine whether an abnormal travel event exists at some location based upon an analysis of the telematics data (block 704).

If a travel event is identified, method 700 may continue to compare a location of the travel event to the current location of the destination vehicle (block 706). Otherwise, method 700 may revert back to receiving telematics data (block 702) and continuing to analyze newly received telematics data for the existence of travel events (block 704).

Method 700 may include one or more processors of the destination device comparing a location of an identified travel event to the current location of the destination device (block 706). This may include, for example, analyzing the telematics data and/or data transmitted with the telematics data to identify the location of the travel event that was generated by the originating device (or another device, when applicable). Again, as discussed above with reference to FIG. 6, the originating device (or another device) may embed these geographic coordinates and/or timestamps within the telematics data transmission (or as part of the telematics data itself). In the present aspect, method 700 may include one or more processors of the destination device using the timestamps to forecast or anticipate the location of an originating device (block 706).

To provide an illustrative example, the timestamps may allow for the calculation of an average velocity of the originating device over the last 30 seconds, and to forecast the location of the originating device at the time the telematics data is later received and processed by the destination device based upon this average velocity and the elapsed time since the most recent timestamp. This forecasted location of the originating device may then be used as part of the comparison calculation (block 706). These aspects may be particularly useful, for example, when delays may be present due to available network bandwidth or during periods when network communications are lost.

To provide another example, the location of the travel event may be compared to a particular (e.g., default or predetermined) radius from the current location of the destination device (block 706). To provide yet another example, the location of the travel event may be averaged from multiple originating devices and/or form a geofenced boundary, as discussed above with reference to FIG. 6. In such a case, method 600 may include performing a comparison of whether the current location of the destination device is within a threshold range of any portion of a calculated geofence, is within a boundary formed by the geofence, and/or is within a threshold distance from a calculated average distance between multiple originating devices (block 706). To provide still another example, when a single originating device location is used, the comparison between locations may determine whether the location of the originating device and the destination device are within a threshold or predetermined distance of one another (block 706).

To provide additional examples, as discussed above with reference to FIG. 6, the comparison between the location of the abnormal travel event may be compared to a route or road upon which the destination vehicle is currently traveling (block 706). The result of this comparison may provide, for example, a suitable flag being set (e.g., in a memory accessed by the one or more processors of the destination device), and/or the results of the comparison being stored, generated, and/or communicated so that a determination of whether the abnormal travel event that was identified (block 704) presents an issue to the driver or the vehicle associated with the destination device (block 708).

That is, the destination device may determine whether, from the result of the comparison that was made between the location of the abnormal travel event to the current location of the destination vehicle (block 706), the travel event presents an issue (block 708).

If the abnormal travel condition that presents an issue to the driver or vehicle, aspects include one or more processors of the destination device automatically taking a preventive or corrective action (block 710). Otherwise, method 700 may revert back to receiving telematics data (block 702) and continuing to analyze newly received telematics data for the existence of travel events (block 704).

Again, upon identifying the travel event, the destination vehicle may automatically take a preventive or corrective action such as generating an alert, presenting a visual alert, providing an audible alert, determining, generating, and/or receiving (e.g., via communications with an external computing device) an alternate travel route that avoids the location of the travel event, presenting and/or displaying the alternative travel route that avoids the location of the travel event (e.g., the GPS location of the travel event and/or the identified location of the originating vehicle), providing audio driving directions for the destination vehicle to travel along the alternate travel route, etc. (block 710).

To provide another example, if the destination vehicle is an autonomous (or semi-autonomous) vehicle, upon identifying the travel event, the destination vehicle may not only generate an alternate travel route that avoids a location of the travel event, but may additionally automatically direct the destination vehicle to take the alternative travel route by driving itself along the alternate route (block 710).

In this way, method 700 may alleviate a negative impact of the travel event upon the driver of the destination vehicle or the destination vehicle itself to facilitate safer and/or more efficient travel.

Exemplary End-User Device & GPS Comparison

In one aspect, a computer-implemented method may be provided regarding using telematics (and/or other) data to provide telematics data-based risk mitigation or prevention functionality. The method may include (a) receiving telematics data, at or by (1) a mobile device associated with a driver, and/or (2) a smart vehicle controller of a vehicle associated with the driver, via wireless communication and/or data transmission; (b) analyzing or reviewing the telematics data, at or by the mobile device (or smart vehicle controller) to determine that a travel event exists (that is revealed by the telematics data) based upon the telematics data and/or a Global Positioning System (GPS) location of the travel event (such as revealed by the telematics data); (c) if the travel event exists, then further determining if the travel event presents an issue or problem for the driver (e.g., owner of the mobile device or smart vehicle, an insured driver of the vehicle, etc.), via the mobile device (or smart vehicle controller), such as by determining that the GPS location of the travel event is located along or on the current travel route of the vehicle, and/or in a vicinity or ahead of the current GPS location of the mobile device (or smart vehicle controller); and/or (d) if so, automatically taking a preventive or corrective action, at or via the mobile device (or smart vehicle controller) that alleviates a negative impact of the travel event on the driver and/or vehicle to facilitate safer and/or more efficient vehicle travel. The method may include additional, fewer, or alternate actions, including those discussed elsewhere herein.

For instance, the preventive or corrective action taken may include: generating or determining an alert, at or via the mobile device (and/or smart vehicle controller); presenting a visual alert, at or via the mobile device (and/or smart vehicle controller), on a display or display screen associated with the mobile device (and/or smart vehicle controller); and/or providing an audio or audible alert, at or via the mobile device (and/or smart vehicle controller). The preventive or corrective action taken may be: generating, determining, or receiving an alternate travel route that avoids the GPS location of the travel event, at or via the mobile device (and/or smart vehicle controller); and/or presenting the alternative travel route, at or via the mobile device (and/or smart vehicle controller), on a display or display screen for use by the driver.

Additionally or alternatively, the preventive or corrective action taken may include: generating an alternate travel route that avoids the GPS location of the travel event, at or via the mobile device (and/or smart vehicle controller); and/or automatically directing the vehicle to take or follow the alternative travel route, at or via the mobile device (and/or smart vehicle controller), such as by directing an autonomous or semi-autonomous vehicle to take the alternate travel route.

Additionally or alternatively, the telematics data may be (1) generated or collected by a second mobile device or a second smart vehicle controller associated with an originating vehicle, and (2) may include speed, acceleration, deceleration, location, lane information, and other data associated with the second mobile device or the second smart vehicle controller. Additionally or alternatively, the telematics data may include time, braking, acceleration, left turn, right turn, heading, GPS speed (e.g., speed determined from changes in GPS location over time versus the speed data collected via an onboard vehicle speedometer sensor), GPS latitude and longitude, angular velocity data, a battery level associated with the second mobile device, telephone usage information associated with the second mobile device, and/or data associated with the second mobile device or the second smart vehicle controller.

In yet additional aspects, the telematics data may include a timestamp; one or more sensor metrics indicative of braking motion of the originating vehicle; one or more sensor metrics indicative of acceleration motion of the originating vehicle; one or more sensor metrics indicative of cornering motion of the originating vehicle; one or more sensor metrics indicative of a direction of the originating vehicle; one or more sensor metrics indicative of a usage of the second mobile device; a battery level associated with the second mobile device; and/or a usage indicator associated with the second mobile device.

In various aspects, the telematics data may be transmitted from the originating device to one or more destination devices directly or indirectly. For example, in one aspect, the telematics data may be generated or collected by a second mobile device or a second smart vehicle controller associated with the originating vehicle, and transmitted from the second mobile device or the second smart vehicle controller directly to the mobile device or the smart vehicle controller.

In other aspects, the telematics data may be generated or collected by a second mobile device or a second smart vehicle controller associated with the originating vehicle, and transmitted from the second mobile device or second smart vehicle controller directly to smart infrastructure, the smart infrastructure in turn relaying or transmitting the telematics data to the mobile device or smart vehicle controller.

In additional aspects, the telematics data may be generated or collected by a second mobile device or a second smart vehicle controller associated with the originating vehicle, and transmitted from the second mobile device or second smart vehicle controller directly to remote server, the remote server in turn relaying or transmitting the telematics data to the mobile device or smart vehicle controller.

Furthermore, aspects include one or more processors associated with the remote server (or another suitable computing device) adjusting or modifying an insurance policy, premium, or discount for an insured customer based upon the insured customer having a mobile device or vehicle equipped with the telematics data-based risk mitigation or prevention functionality.

For instance, one or more processors associated with the remote server (or another suitable computing device) may monitor a time amount or a mileage amount that the insured customer drives the vehicle with the telematics data-based risk mitigation or prevention functionality enabled and/or being executed on the mobile device or smart vehicle controller; and adjust or modify an insurance policy, premium, or discount for the insured customer based upon the insured customer's usage or an amount that the insured customer uses or employs the telematics data-based risk mitigation or prevention functionality. The functionality may include (i) generating, collecting, broadcasting, or receiving telematics data, and (ii) generating appropriate alerts or recommendations.

Exemplary End-User Device & GPS Comparison

In another aspect, a computer-implemented method may be provided for using telematics (and/or other) data at a destination vehicle or device to provide telematics data-based risk mitigation or prevention functionality. The method may include (a) receiving telematics data, at or by (1) a mobile device associated with a driver, and/or (2) a smart vehicle controller of a vehicle associated with the driver, via wireless communication and/or data transmission; (b) analyzing or reviewing the telematics data, at or by the mobile device (or smart vehicle controller) to determine that a travel event exists (that is revealed by the telematics data); (c) comparing a GPS location, at or by the mobile device (or smart vehicle controller), of the travel event (such as revealed by the telematics data) with a current GPS location or current travel route of the mobile device (and/or smart vehicle controller); (d) based upon the comparison, determining if the travel event presents an issue or problem for the driver of the vehicle, via the mobile device (or smart vehicle controller), such as by determining that the GPS location of the travel event is located along or on the current travel route of the vehicle, and/or in a vicinity (e.g., within a predetermined distance (such as 5 miles for highway travel, or 3 blocks for city street travel)) or ahead of the current GPS location of the mobile device (or smart vehicle controller); and/or (e) if so, automatically taking a preventive or corrective action, at or via the mobile device (or smart vehicle controller) that alleviates a negative impact of the travel event on the driver to facilitate safer and/or more efficient vehicle travel. The method may include additional, fewer, or alternate actions, including those discussed elsewhere herein.

For instance, the preventive or corrective action taken may include: generating or determining alert, at or via the mobile device (and/or smart vehicle controller); presenting a visual alert, at or via the mobile device (and/or smart vehicle controller), on a display or display screen associated with the mobile device (and/or smart vehicle controller); and/or providing an audio or audible alert, at or via the mobile device (and/or smart vehicle controller).

Additionally or alternatively, the preventive or corrective action taken may include: generating, determining, or receiving an alternate travel route that avoids the GPS location of the travel event, at or via the mobile device (and/or smart vehicle controller); and/or presenting the alternative travel route, at or via the mobile device (and/or smart vehicle controller), on a display or display screen for use by the driver.

Additionally or alternatively, the preventive or corrective action taken may be: generating, determining, and/or receiving an alternate travel route that avoids the location of the travel event, at or via the mobile device (and/or smart vehicle controller); and/or automatically directing the vehicle to take or follow the alternative travel route, at or via the mobile device (and/or smart vehicle controller), such as by directing an autonomous vehicle to take the alternate travel route.

In various aspects, the telematics data may be transmitted from the originating device to one or more destination devices directly or indirectly. For example, in one aspect, the telematics data may be generated or collected by a second mobile device or a second smart vehicle controller associated with the originating vehicle, and transmitted from the second mobile device or the second smart vehicle controller directly to the mobile device or the smart vehicle controller.

In other aspects, the telematics data may be generated or collected by a second mobile device or a second smart vehicle controller associated with the originating vehicle, and transmitted from the second mobile device or second smart vehicle controller directly to smart infrastructure, the smart infrastructure in turn relaying or transmitting the telematics data to the mobile device or smart vehicle controller.

In additional aspects, the telematics data may be generated or collected by a second mobile device or a second smart vehicle controller associated with the originating vehicle, and transmitted from the second mobile device or second smart vehicle controller directly to remote server, the remote server in turn relaying or transmitting the telematics data to the mobile device or smart vehicle controller.

Furthermore, aspects include one or more processors associated with the remote server (or another suitable computing device) adjusting or modifying an insurance policy, premium, or discount for an insured customer based upon the insured customer having a mobile device or vehicle equipped with the telematics data-based risk mitigation or prevention functionality.

For instance, one or more processors associated with the remote server (or another suitable computing device) may monitor a time amount or a mileage amount that the insured customer drives the vehicle with the telematics data-based risk mitigation or prevention functionality enabled and/or being executed on the mobile device or smart vehicle controller; and adjust or modify an insurance policy, premium, or discount for the insured customer based upon the insured customer's usage or an amount that the insured customer uses or employs the telematics data-based risk mitigation or prevention functionality. The functionality may include (i) generating, collecting, broadcasting, or receiving telematics data, and (ii) generating appropriate alerts or recommendations.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or vehicle that are configured to receive telematics data associated with other vehicles and/or abnormal road or travel conditions that other drivers are experiencing. The telematics may be received directly from other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk-averse behavior and/or safer driving with lower insurance premiums, rates, and/or increased discounts, such as for usage-based or other types of auto insurance.

Furthermore, an insurance provider may promote or reward the use of one or more aspects described herein with lower insurance premiums, rates, and/or increased discounts. For example, an insurer may provide discounts or other incentives upon an insured customer installing an application to their mobile computing device that enables the mobile computing device to broadcast telematics data and/or to generate alert notifications based upon telematics data received from other devices.

Additionally or alternatively, an insurer may provide discounts or other incentives upon an amount that an insured customer uses the telematics application on their mobile computing device that enables the mobile computing device to broadcast telematics data and/or to generate alert notifications based upon telematics data received from other devices. Such usage-based discounts or incentives may be based upon amount of time of, or number of miles of, use or usage, e.g., an amount of time or miles that the insured drove during a specific period with a Telematics App running or executing on their mobile device (which was located within the insured vehicle as it travels), the Telematics App configured to collect and broadcast telematics data, and/or to receive telematics data from other vehicles or devices, and generate alerts or recommendations based upon the data received.

Additional Considerations

With the foregoing, an insurance customer may opt-in to a rewards, insurance discount, or other type of program. After the insurance customer provides their affirmative consent, an insurance provider telematics application and/or remote server may collect telematics and/or other data (including image or audio data) associated with insured assets, including before, during, and/or after an insurance-related event or vehicle collision. In return, risk-averse drivers, and/or vehicle owners may receive discounts or insurance cost savings related to auto, home, life, and other types of insurance from the insurance provider.

In one aspect, telematics data, and/or other data, including the types of data discussed elsewhere herein, may be collected or received by an insured's mobile device or smart vehicle, a Telematics App (including those discussed herein), and/or an insurance provider remote server, such as via direct or indirect wireless communication or data transmission from a Telematics App running on the insured's mobile device, after the insured or customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, etc., aspects include any suitable number of mobile computing devices, vehicles, etc. For example, aspects include an external computing device receiving telematics data and/or geographic location data from a large number of mobile computing devices (e.g., 100 or more), and issuing alerts to those mobile computing devices in which the alerts are relevant in accordance with the various techniques described herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed:

1. A computer-implemented method of using telematics data to provide telematics data-based risk mitigation or prevention functionality, the method comprising:
   receiving, via a destination computing device associated with a destination vehicle and a destination driver, the telematics data from an originating computing device;
   determining, via the destination computing device based upon an analysis of the telematics data, a geographic location of a travel event using Global Positioning System (GPS) data;
   identifying, via the destination computing device, a relevance of the travel event by determining, using the telematics data, whether the geographic location of the travel event is located (i) along a current travel route of the destination vehicle, or (ii) within a threshold distance of a current GPS location of the destination computing device; and
   when the travel event is identified to be relevant, at least one of:
      (i) providing, via the destination computing device, a graphical user interface (GUI) to alert the destination driver, the GUI including a display of:
         (a) an indication of a description of the travel event, the indication of the description of the travel event including at least one of a text indication of the description or a graphical indication of the description, and
         (b) an indication of the geographic location of the travel event, the indication of the geographic location of the travel event including at least one of a text indication of the geographic location, a graphical indication of the geographic location, or a map indicating the geographic location, or
      (ii) automatically taking at least one other corrective action, via the destination computing device, to affect driving of the destination vehicle.

2. The computer-implemented method of claim 1, wherein one or more sensors indicate that the originating computing device is located within an originating vehicle when the one or more sensors indicate that the originating computing device has exceeded a threshold speed for a threshold duration of time.

3. The computer-implemented method of claim 1, wherein the telematics data includes data indicative of a driving speed limit at a location corresponding to the geographic location of an originating vehicle, and further comprising:
identifying, via the destination computing device, the travel event based upon a comparison of the speed of the originating vehicle to the driving speed limit.

4. The computer-implemented method of claim 1, wherein determining whether the geographic location of the travel event is located within the threshold distance of the current GPS location of the destination computing device includes determining whether the destination vehicle is within a geofence that has a shape matching a road upon which an originating vehicle is traveling.

5. The computer-implemented method of claim 1, wherein the at least one other corrective action includes generating an alternate travel route that avoids the geographic location of the travel event.

6. The computer-implemented method of claim 1, wherein the telematics data is indicative of one or more of GPS speed, lane information associated with an originating vehicle, time, turning associated with the originating vehicle, battery level associated with the originating computing device, and telephone usage information associated the originating computing device.

7. The computer-implemented method of claim 1, wherein the telematics data indicates that an originating vehicle is experiencing one or more of high traffic conditions, congestion, road construction, and extreme weather conditions.

8. A destination computing device associated with a destination vehicle and a destination driver, comprising:
a communication unit comprising a transceiver and configured to receive telematics data from an originating computing device;
one or more processors configured to:
 determine, based upon an analysis of the telematics data, a geographic location of a travel event using Global Positioning System (GPS) data;
 identify a relevance of the travel event by determining, using the telematics data, whether the geographic location of the travel event is located (i) along a current travel route of the destination vehicle, or (ii) within a threshold distance of a current GPS location of the destination computing device;
 when the travel event is identified to be relevant, automatically direct at least one corrective action to alert the destination driver, the at least one corrective action including at least one of providing a graphical user interface (GUI) or at least one other corrective action that affects driving of the destination vehicle; and
a display configured to at least one of
 (i) provide the GUI, the GUI including a screen showing
  (a) an indication of a description of the travel event, the indication of the description of the travel event including at least one of a text indication of the description or a graphical indication of the description, and
  (b) an indication of the geographic location of the travel event, the indication of the geographic location of the travel event including at least one of a text indication of the geographic location, a graphical indication of the geographic location, or a map indicating the geographic location, or
 (ii) present insurance policy pricing adjustment information associated with the destination driver that is based upon a destination driver risk due to the identified travel event, so as to promote or reward risk averse behavior and safer driving.

9. The destination computing device of claim 8, wherein one or more sensors indicate that the originating computing device is located within an originating vehicle when the one or more sensors indicate that the originating computing device has exceeded a threshold speed for a threshold duration of time.

10. The destination computing device 8, wherein the telematics data includes data indicative of a driving speed limit at a location corresponding to the geographic location of an originating vehicle, and
wherein the one or more processors are further configured to identify the travel event based upon a comparison of the speed of the originating vehicle to the driving speed limit.

11. The destination computing device of claim 8, wherein the one or more processors are further configured to determine whether the geographic location of the travel event is located within the threshold distance of the current GPS location of the destination computing device based upon whether the destination vehicle is within a geofence that has a shape matching a road upon which an originating vehicle is traveling.

12. The destination computing device of claim 8, wherein the one or more processors are configured to automatically direct the at least one preventive or corrective action by generating an alternate travel route that avoids the geographic location of the travel event.

13. The destination computing device of claim 8, wherein the telematics data is indicative of one or more of GPS speed, lane information associated with an originating vehicle, time, turning associated with the originating vehicle, battery level associated with the originating computing device, and telephone usage information associated the originating computing device.

14. The destination computing device of claim 8, wherein the telematics data indicates that an originating vehicle is experiencing one or more of high traffic conditions, congestion, road construction, and extreme weather conditions.

15. A tangible, non-transitory, computer-readable medium associated with a destination computing device that is associated with a destination vehicle and a destination driver, the computer-readable medium storing instructions that, when executed by one or more processors of the destination computing device, cause the destination computing device to:
receive telematics data generated by an originating computing device;
determine, based upon an analysis of the telematics data, a geographic location of a travel event using Global Positioning System (GPS) data;
identify a relevance of the travel event by determining, using the telematics data, whether the geographic location of the travel event is located (i) along a current travel route of the destination vehicle, or (ii) within a threshold distance of a current GPS location of the destination computing device;
when the travel event is identified to be relevant, perform at least one of:
 (i) provide a graphical user interface (GUI) to alert the destination driver, the GUI including a display of (a) an indication of a description of the travel event, the indication of the description of the travel event including at least one of a text indication of the description or a graphical indication of the description, and
(b) an indication of the geographic location of the travel event, the indication of the geographic location of the travel event including at least one of a text indication of the geographic location, a graphical indication of the geographic location, or a map indicating the geographic location, or (ii) automatically cause at least one other corrective action to affect driving of the destination vehicle.

16. The tangible, non-transitory, computer-readable medium of claim 15, wherein one or more sensors indicate that the originating computing device is located within an originating vehicle when the one or more sensors indicate that the originating computing device has exceeded a threshold speed for a threshold duration of time.

17. The tangible, non-transitory, computer-readable medium of claim 15, wherein the telematics data includes data indicative of a driving speed limit at a location corresponding to the geographic location of an originating vehicle, and wherein the instructions, when executed by one or more processors, further cause the destination computing device to identify the travel event based upon a comparison of the speed of the originating vehicle to the driving speed limit.

18. The tangible, non-transitory, computer-readable medium of claim 15, wherein the instructions, when executed by the one or more processors, further cause the destination computing device to determine whether the geographic location of the travel event is located within the threshold distance of the current GPS location of the destination computing device based upon whether the destination vehicle is within a geofence that has a shape matching a road upon which an originating vehicle is traveling.

19. The tangible, non-transitory, computer-readable medium of claim 15, wherein the instructions, when executed by the one or more processors, cause the destination computing device to generate an alternate travel route that avoids the geographic location of the travel event.

20. The tangible, non-transitory, computer-readable medium of claim 15, wherein the telematics data indicates (i) one or more of GPS speed, lane information associated with an originating vehicle, time, turning associated with the originating vehicle, battery level associated with the originating computing device, and telephone usage information associated the originating computing device, and (ii) that the originating vehicle is experiencing one or more of high traffic conditions, congestion, road construction, and extreme weather conditions.

\* \* \* \* \*